US008208176B2

(12) United States Patent
Takahashi et al.

(10) Patent No.: US 8,208,176 B2
(45) Date of Patent: Jun. 26, 2012

(54) REDUCTION OF UNEVEN PRINT DENSITY

(75) Inventors: Toru Takahashi, Matsumoto (JP); Toshiaki Kakutani, Shiojiri (JP); Satoshi Yamazaki, Shiojiri (JP); Kazuyoshi Tanase, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 961 days.

(21) Appl. No.: 11/974,021

(22) Filed: Oct. 10, 2007

(65) Prior Publication Data

US 2008/0123148 A1 May 29, 2008

(30) Foreign Application Priority Data

Oct. 12, 2006 (JP) ................................ 2006-278389

(51) Int. Cl.
*G06K 15/00* (2006.01)

(52) U.S. Cl. ........................ 358/3.06; 358/3.13; 358/1.9

(58) Field of Classification Search ................ 358/3.06, 358/3.13, 1.9, 1.15, 1.16, 2.99, 3.01
See application file for complete search history.

(56) References Cited

U.S. PATENT DOCUMENTS 4,924,301 A * 5/1990 Surbrook ...................... 358/534
5,790,240 A 8/1998 Ishikawa et al.
6,089,691 A 7/2000 Kakutani
6,099,105 A 8/2000 Kakutani
6,338,538 B1 1/2002 Toshiaki
6,376,138 B1 * 4/2002 Horsten et al. .................. 430/30
6,799,824 B2 10/2004 Nunokawa
7,236,616 B1 * 6/2007 Scott ............................ 382/124
7,684,081 B2 * 3/2010 Miyata .......................... 358/1.9

(Continued)

FOREIGN PATENT DOCUMENTS

JP 09-247453 9/1997
JP 09-258347 10/1997

(Continued)

OTHER PUBLICATIONS

Abstract of Japanese Patent Publication No. 2005-219286, Pub. Date: Aug. 18, 2005, Patent Abstracts of Japan.

(Continued)

*Primary Examiner* — King Poon
*Assistant Examiner* — Allen H Nguyen
(74) *Attorney, Agent, or Firm* — Martine Penilla Group, LLP

(57) ABSTRACT

The invention provides a printing method of printing on a printing medium. The method includes: generating dot data that represents state of dot formation at each print pixel of a print image to be formed on the printing medium by performing a halftone process on image data that represents an input tone value of each pixel making up an original image; and generating the print image by forming dots on each of the print pixels according to the dot data. The halftone process determines the state of dot formation by using a dither matrix that stores a plurality of threshold values, the plurality of threshold values being used for determining state of dot formation at each of print pixels of the print image to be formed on the printing medium according to an input tone value. The dither matrix is a matrix that stores each of the plurality of threshold values in each element such that a mutual difference in dot density formed at each predetermined print pixel group according to each input tone value falls within a predetermined range. The predetermined print pixel group is a cluster of plural print pixels corresponding to each of a plurality of element groups that are created by dividing the dither matrix into preset numbers of elements.

15 Claims, 22 Drawing Sheets

U.S. PATENT DOCUMENTS

| | | | | |
|---|---|---|---|---|
| 2002/0080394 | A1* | 6/2002 | Ogasahara et al. | 358/1.15 |
| 2002/0113985 | A1* | 8/2002 | Tayuki | 358/1.9 |
| 2005/0219563 | A1* | 10/2005 | Kakutani | 358/1.9 |
| 2007/0081841 | A1* | 4/2007 | Nakano | 400/62 |

FOREIGN PATENT DOCUMENTS

| | | |
|---|---|---|
| JP | 2000-299786 | 10/2000 |
| JP | 2001-030521 | 2/2001 |
| JP | 2001-157055 | 6/2001 |
| JP | 2003-291376 | 10/2003 |
| JP | 2004-009534 | 1/2004 |
| JP | 2004-015780 | 1/2004 |
| JP | 2004-167752 | 6/2004 |
| JP | 2005-219286 | 8/2005 |

OTHER PUBLICATIONS

Abstract of Japanese Patent Publication No. 09-247453, Pub. Date: Sep. 19, 1997, Patent Abstracts of Japan.

Abstract of Japanese Patent Publication No. 09-258347, Pub. Date: Oct. 3, 1997, Patent Abstracts of Japan.

Abstract of Japanese Patent Publication No. 2000-299786, Pub. Date: Oct. 24, 2000, Patent Abstracts of Japan.

Abstract of Japanese Patent Publication No. 2001-030521, Pub. Date: Feb. 6, 2001, Patent Abstracts of Japan.

Abstract of Japanese Patent Publication No. 2001-157055, Pub. Date: Jun. 8, 2001, Patent Abstracts of Japan.

Abstract of Japanese Patent Publication No. 2003-291376, Pub. Date: Oct. 14, 2003, Patent Abstracts of Japan.

Abstract of Japanese Patent Publication No. 2004-009534, Pub. Date: Jan. 15, 2004, Patent Abstracts of Japan.

Abstract of Japanese Patent Publication No. 2004-015780, Pub. Date: Jan. 15, 2004, Patent Abstracts of Japan.

Abstract of Japanese Patent Publication No. 2004-167752, Pub. Date: Jun. 17, 2004, Patent Abstracts of Japan.

* cited by examiner

| 1 | 177 | 58 | 170 | 70 | 186 | 79 | 161 | 94 | 171 | 16 | 164 | 24 | 158 | 227 | 6 | 133 | 157 |
|---|---|---|---|---|---|---|---|---|---|---|---|---|---|---|---|---|---|
| 255 | 109 | 212 | 42 | 242 | 5 | 223 | 48 | 209 | 67 | 248 | 81 | 234 | 132 | 56 | 120 | 253 | |
| 123 | 33 | 127 | 181 | 83 | 155 | 105 | 140 | 30 | 150 | 119 | 182 | 40 | 89 | 220 | 163 | 44 | |
| 219 | 91 | 237 | 22 | 121 | 198 | 61 | 188 | 111 | 215 | 3 | 98 | 201 | 140 | 10 | 95 | | |
| 11 | 195 | 53 | 136 | 227 | 37 | 247 | 12 | 233 | 52 | 192 | 135 | 32 | 246 | 113 | 194 | | |
| 99 | 144 | 107 | 184 | 68 | 172 | 97 | 151 | 77 | 173 | 84 | 237 | 123 | 61 | 167 | 46 | | |
| 225 | 40 | 251 | 6 | 217 | 116 | 28 | 196 | 125 | 35 | 207 | 17 | 153 | 203 | 24 | | | |
| 87 | 169 | 78 | 162 | 59 | 146 | 211 | 64 | 254 | 142 | 72 | 178 | 87 | 118 | 228 | | | |
| 190 | 15 | 202 | 111 | 238 | 19 | 93 | 169 | 8 | 110 | 221 | 49 | 249 | 2 | 144 | | | |
| 74 | 246 | 134 | 43 | 174 | 128 | 230 | 50 | 216 | 154 | 26 | 168 | 79 | 184 | | | | |
| 176 | 30 | 98 | 219 | 86 | 34 | 139 | 195 | 101 | 56 | 241 | 127 | 213 | 37 | | | | |
| 69 | 148 | 196 | 2 | 159 | 247 | 89 | 11 | 136 | 185 | 92 | 14 | 108 | | | | | |
| 187 | 41 | 126 | 226 | 106 | 57 | 190 | 115 | 235 | 36 | 208 | 121 | 229 | | | | | |
| 81 | 214 | 92 | 53 | 145 | 204 | 27 | 166 | 74 | 157 | 82 | 165 | 31 | | | | | |
| 232 | 21 | 170 | 240 | 13 | 132 | 252 | 51 | 222 | 4 | 245 | 48 | | | | | | |
| 130 | 155 | 55 | 115 | 183 | 78 | 122 | 196 | 102 | 180 | 65 | 173 | | | | | | |
| 72 | 252 | 100 | 211 | 45 | 231 | 20 | 148 | 39 | 133 | 205 | | | | | | | |
| 202 | 32 | 179 | 5 | 163 | 95 | 191 | 86 | 239 | 111 | 29 | | | | | | | |
| 104 | 143 | 58 | 243 | 70 | 218 | 63 | 161 | 9 | 209 | | | | | | | | |
| 64 | 236 | 129 | 110 | 151 | 25 | 199 | 49 | 172 | 68 | | | | | | | | |
| 171 | 17 | 208 | 38 | 225 | 131 | 99 | 254 | 113 | | | | | | | | | |
| 80 | 191 | 87 | 174 | 76 | 189 | 13 | 143 | | | | | | | | | | |
| 247 | 35 | 152 | 2 | 248 | 55 | | | | | | | | | | | | |
| 140 | 108 | 197 | 127 | 96 | | | | | | | | | | | | | |
| 13 | 215 | 46 | 229 | | | | | | | | | | | | | | |
| 164 | 90 | 180 | | | | | | | | | | | | | | | |
| 52 | 253 | | | | | | | | | | | | | | | | |
| 205 | | | | | | | | | | | | | | | | | |

$$VTF(u) = 5.05 \cdot \exp\left(\frac{-0.138\,\pi\,L \cdot u}{180}\right) \cdot \left\{1 - \exp\left(\frac{-0.1\,\pi\,L \cdot u}{180}\right)\right\} \quad \cdots F1$$

$$\text{GRAININESS INDEX} = K \int FS(u) \cdot VTF(u)\,du \quad \cdots F2$$

MAIN SCANNING DIRECTION
SUB SCANNING DIRECTION
Dpm1a
Dpm1b
Dpm1c
RL1a
RL2a
RL3a
RL1b
RL2b
RL3b
RL1c
RL2c
RL3c
256 PIXELS (IN CASE OF 9mm, 720dpi)
74
52
64
256 PIXELS (IN CASE OF 9mm, 720dpi)

Fig.12

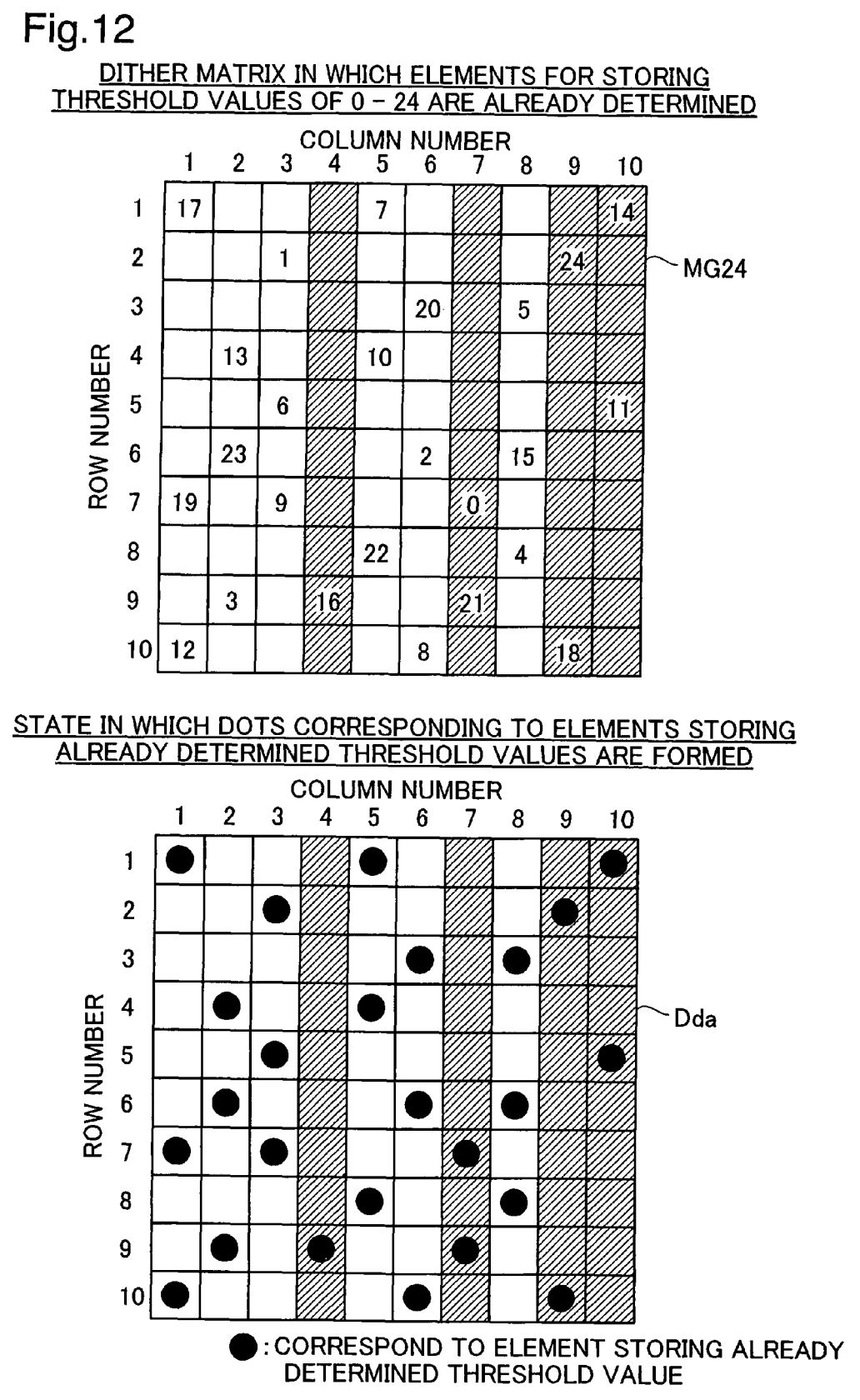

DITHER MATRIX IN WHICH ELEMENTS FOR STORING THRESHOLD VALUES OF 0 – 24 ARE ALREADY DETERMINED

COLUMN NUMBER / ROW NUMBER

| ROW \ COLUMN | 1 | 2 | 3 | 4 | 5 | 6 | 7 | 8 | 9 | 10 |
|---|---|---|---|---|---|---|---|---|---|---|
| 1 | 17 | | | | 7 | | | | | 14 |
| 2 | | | 1 | | | | | | 24 | |
| 3 | | | | | | 20 | | 5 | | |
| 4 | | 13 | | | 10 | | | | | |
| 5 | | | 6 | | | | | | | 11 |
| 6 | | 23 | | | | 2 | | 15 | | |
| 7 | 19 | | 9 | | | | 0 | | | |
| 8 | | | | | 22 | | | 4 | | |
| 9 | | 3 | | 16 | | | 21 | | | |
| 10 | 12 | | | | | 8 | | | 18 | |

MG24

STATE IN WHICH DOTS CORRESPONDING TO ELEMENTS STORING ALREADY DETERMINED THRESHOLD VALUES ARE FORMED

COLUMN NUMBER / ROW NUMBER

| ROW \ COLUMN | 1 | 2 | 3 | 4 | 5 | 6 | 7 | 8 | 9 | 10 |
|---|---|---|---|---|---|---|---|---|---|---|
| 1 | ● | | | | ● | | | | | ● |
| 2 | | | ● | | | | | | ● | |
| 3 | | | | | | ● | | ● | | |
| 4 | | ● | | | ● | | | | | |
| 5 | | | ● | | | | | | | ● |
| 6 | | ● | | | | ● | | ● | | |
| 7 | ● | | ● | | | | ● | | | |
| 8 | | | | | ● | | | ● | | |
| 9 | | ● | | ● | | | ● | | | |
| 10 | ● | | | | | ● | | | ● | |

Dda

●: CORRESPOND TO ELEMENT STORING ALREADY DETERMINED THRESHOLD VALUE

Fig.14

COLUMN NUMBER

| ROW NUMBER | 1 | 2 | 3 | 4 | 5 | 6 | 7 | 8 | 9 | 10 | ROW-WISE NUMBER OF ALREADY DETERMINED THRESHOLD VALUES |
|---|---|---|---|---|---|---|---|---|---|---|---|
| 1 | 17 | *1 | *2 | *3 | 7 | | | | | 14 | 3 |
| 2 | | | 1 | | | | | | 24 | | 2 |
| 3 | | | | | | 20 | | 5 | | | 2 |
| 4 | | 13 | | | 10 | | | | | | 2 |
| 5 | | | 6 | | | | | | | 11 | 2 |
| 6 | | 23 | | | | 2 | | 15 | | | 3 |
| 7 | 19 | | 9 | | | | 0 | | | | 3 |
| 8 | | | | | 22 | | | 4 | | | 2 |
| 9 | | 3 | | 16 | | | 21 | | | | 3 |
| 10 | 12 | | | | | 8 | | | 18 | | 3 |
| COLUMN-WISE NUMBER OF ALREADY DETERMINED THRESHOLD VALUES | 3 | 3 | 3 | 1 | 3 | 3 | 2 | 3 | 2 | 2 | |

Fig.15

COLUMN NUMBER

| ROW NUMBER | 1 | 2 | 3 | 4 | 5 | 6 | 7 | 8 | 9 | 10 |
|---|---|---|---|---|---|---|---|---|---|---|
| 1 | ● | | | | | | ● | | | ● |
| 2 | | | ● | | | | | | ● | |
| 3 | | | | | | ● | | ● | | |
| 4 | | ● | | | ● | | | | | |
| 5 | | | ● | | | | | | | ● |
| 6 | | ● | | | | ● | | ● | | |
| 7 | ● | | ● | | | | ● | | | |
| 8 | | | | | ● | | | ● | | |
| 9 | | ● | | ● | | | ● | | | |
| 10 | ● | | | | | ● | | | ● | |

Dpa1

COLUMN NUMBER

| ROW NUMBER | 1 | 2 | 3 | 4 | 5 | 6 | 7 | 8 | 9 | 10 |
|---|---|---|---|---|---|---|---|---|---|---|
| 1 | 1 | 0 | 0 | 0 | 0 | 0 | 1 | 0 | 0 | 1 |
| 2 | 0 | 0 | 1 | 0 | 0 | 0 | 0 | 0 | 1 | 0 |
| 3 | 0 | 0 | 0 | 0 | 0 | 1 | 0 | 1 | 0 | 0 |
| 4 | 0 | 1 | 0 | 0 | 1 | 0 | 0 | 0 | 0 | 0 |
| 5 | 0 | 0 | 1 | 0 | 0 | 0 | 0 | 0 | 0 | 1 |
| 6 | 0 | 1 | 0 | 0 | 0 | 1 | 0 | 1 | 0 | 0 |
| 7 | 1 | 0 | 1 | 0 | 0 | 0 | 1 | 0 | 0 | 0 |
| 8 | 0 | 0 | 0 | 0 | 1 | 0 | 0 | 1 | 0 | 0 |
| 9 | 0 | 1 | 0 | 1 | 0 | 0 | 1 | 0 | 0 | 0 |
| 10 | 1 | 0 | 0 | 0 | 0 | 1 | 0 | 0 | 1 | 0 |

Dda1

PASS 1
PASS 2
PASS 3
PASS 4
k=2
Ls=3
10
MAIN SCAN DIRECTION
SUB-SCAN DIRECTION
FORWARD DIRECTION
RETURN DIRECTION
DOT PATTERN
FIRST PIXEL GROUP
SECOND PIXEL GROUP
THIRD PIXEL GROUP
FOURTH PIXEL GROUP
PIXEL POSITION NUMBER
RASTER NUMBER

COMPUTATIONAL EQUATION FOR EVALUATION VALUE $$E = Ga \times Wa + (G1 + G2 + G3 + G4) \times Wg$$

E : EVALUATION VALUE
Ga: GRAININESS INDEX (ALL PIXELS)
G1、G2、G3、G4: GRAININESS INDEX (PIXEL GROUP)
Wa、Wg: WEIGHTING COEFFICIENT

Fig.23

| | 1 COLUMN | 2 COLUMN | 3 COLUMN | 4 COLUMN | 5 COLUMN | 6 COLUMN | 7 COLUMN | 8 COLUMN |
|---|---|---|---|---|---|---|---|---|
| 1 ROW | 1 | 3 | 1 | 3 | 1 | 3 | 1 | 3 |
| 2 ROW | 2 | 4 | 2 | 4 | 2 | 4 | 2 | 4 |
| 3 ROW | 1 | 3 | 1 | 3 | 1 | 3 | 1 | 3 |
| 4 ROW | 2 | 4 | 2 | 4 | 2 | 4 | 2 | 4 |
| 5 ROW | 1 | 3 | 1 | 3 | 1 | 3 | 1 | 3 |
| 6 ROW | 2 | 4 | 2 | 4 | 2 | 4 | 2 | 4 |
| 7 ROW | 1 | 3 | 1 | 3 | 1 | 3 | 1 | 3 |
| 8 ROW | 2 | 4 | 2 | 4 | 2 | 4 | 2 | 4 |

M

MAIN SCANNING DIRECTION

SUB SCANNING DIRECTION

| | 1 | 2 | 3 | 4 | 5 | 6 | 7 | 8 |
|---|---|---|---|---|---|---|---|---|
| 1 | 1 | | 1 | | 1 | | 1 | |
| 2 | | | | | | | | |
| 3 | 1 | | 1 | | 1 | | 1 | |
| 4 | | | | | | | | |
| 5 | 1 | | 1 | | 1 | | 1 | |
| 6 | | | | | | | | |
| 7 | 1 | | 1 | | 1 | | 1 | |
| 8 | | | | | | | | |

M3

| | 1 | 2 | 3 | 4 | 5 | 6 | 7 | 8 |
|---|---|---|---|---|---|---|---|---|
| 1 | | 3 | | 3 | | 3 | | 3 |
| 2 | | | | | | | | |
| 3 | | 3 | | 3 | | 3 | | 3 |
| 4 | | | | | | | | |
| 5 | | 3 | | 3 | | 3 | | 3 |
| 6 | | | | | | | | |
| 7 | | 3 | | 3 | | 3 | | 3 |
| 8 | | | | | | | | |

M2

| | 1 | 2 | 3 | 4 | 5 | 6 | 7 | 8 |
|---|---|---|---|---|---|---|---|---|
| 1 | | | | | | | | |
| 2 | 2 | | 2 | | 2 | | 2 | |
| 3 | | | | | | | | |
| 4 | 2 | | 2 | | 2 | | 2 | |
| 5 | | | | | | | | |
| 6 | 2 | | 2 | | 2 | | 2 | |
| 7 | | | | | | | | |
| 8 | 2 | | 2 | | 2 | | 2 | |

M4

| | 1 | 2 | 3 | 4 | 5 | 6 | 7 | 8 |
|---|---|---|---|---|---|---|---|---|
| 1 | | | | | | | | |
| 2 | | 4 | | 4 | | 4 | | 4 |
| 3 | | | | | | | | |
| 4 | | 4 | | 4 | | 4 | | 4 |
| 5 | | | | | | | | |
| 6 | | 4 | | 4 | | 4 | | 4 |
| 7 | | | | | | | | |
| 8 | | 4 | | 4 | | 4 | | 4 |

Fig.25

STATES OF DOT FORMATION OF DOTS THAT CORRESPOND TO E.G. ELEMENTS STORING ALREADY DETERMINED THRESHOLD VALUES (EACH PIXEL GROUP)

Dp1

| | 1 | 2 | 3 | 4 | 5 | 6 | 7 | 8 |
|---|---|---|---|---|---|---|---|---|
| 1 | * | | 1 | | ● | | 1 | |
| 2 | | | | | | | | |
| 3 | 1 | | 1 | | 1 | | 1 | |
| 4 | | | | | | | | |
| 5 | 1 | | ● | | 1 | | 1 | |
| 6 | | | | | | | | |
| 7 | 1 | | 1 | | 1 | | 1 | |
| 8 | | | | | | | | |

Dp3

| | 1 | 2 | 3 | 4 | 5 | 6 | 7 | 8 |
|---|---|---|---|---|---|---|---|---|
| 1 | | 3 | | 3 | | 3 | | 3 |
| 2 | | | | | | | | |
| 3 | | 3 | | 3 | | ● | | 3 |
| 4 | | | | | | | | |
| 5 | | 3 | | 3 | | 3 | | 3 |
| 6 | | | | | | | | |
| 7 | | 3 | | ● | | 3 | | 3 |
| 8 | | | | | | | | |

Dp2

| | 1 | 2 | 3 | 4 | 5 | 6 | 7 | 8 |
|---|---|---|---|---|---|---|---|---|
| 1 | | | | | | | | |
| 2 | 2 | | 2 | | 2 | | 2 | |
| 3 | | | | | | | | |
| 4 | 2 | | 2 | | 2 | | 2 | |
| 5 | | | | | | | | |
| 6 | 2 | | 2 | | 2 | | 2 | |
| 7 | | | | | | | | |
| 8 | ● | | 2 | | 2 | | ● | |

Dp4

| | 1 | 2 | 3 | 4 | 5 | 6 | 7 | 8 |
|---|---|---|---|---|---|---|---|---|
| 1 | | | | | | | | |
| 2 | | ● | | 4 | | 4 | | 4 |
| 3 | | | | | | | | |
| 4 | | 4 | | 4 | | 4 | | 4 |
| 5 | | | | | | | | |
| 6 | | 4 | | 4 | | 4 | | ● |
| 7 | | | | | | | | |
| 8 | | 4 | | 4 | | 4 | | 4 |

Fig.26

STATE OF DOT FORMATION
AFTER DIGITIZATION (EACH PIXEL GROUP)

Dd1

| | 1 | 2 | 3 | 4 | 5 | 6 | 7 | 8 |
|---|---|---|---|---|---|---|---|---|
| 1 | 1 | | | | 1 | | | |
| 2 | | | | | | | | |
| 3 | | | | | | | | |
| 4 | | | | | | | | |
| 5 | | | 1 | | | | | |
| 6 | | | | | | | | |
| 7 | | | | | | | | |
| 8 | | | | | | | | |

Dd3

| | 1 | 2 | 3 | 4 | 5 | 6 | 7 | 8 |
|---|---|---|---|---|---|---|---|---|
| 1 | | | | | | | | |
| 2 | | | | | | | | |
| 3 | | | | | | 1 | | |
| 4 | | | | | | | | |
| 5 | | | | | | | | |
| 6 | | | | | | | | |
| 7 | | | | 1 | | | | |
| 8 | | | | | | | | |

Dd2

| | 1 | 2 | 3 | 4 | 5 | 6 | 7 | 8 |
|---|---|---|---|---|---|---|---|---|
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | 1 | | | | | | 1 | |

Dd4

| | 1 | 2 | 3 | 4 | 5 | 6 | 7 | 8 |
|---|---|---|---|---|---|---|---|---|
| 1 | | | | | | | | |
| 2 | | 1 | | | | | | |
| 3 | | | | | | | | |
| 4 | | | | | | | | |
| 5 | | | | | | | | |
| 6 | | | | | | | | 1 |
| 7 | | | | | | | | |
| 8 | | | | | | | | |

SUB SCAN FEED IN INTERLACE RECORDING MODE (NON-OVERLAP)
MAIN SCANNING
SUB SCANNING
PASS1
PASS2
PASS3
PASS4
L=4
k=3
1000
IN CASE WHERE DOT POSITIONS ARE NORMAL
IN CASE WHERE DOTS ASSOCIATED WITH FIRST NOZZLE IS MISALIGNED UPWARDS
RASTER NUMBER
RASTER NUMBER
Dtp1
Dtp2

REDUCTION OF UNEVEN PRINT DENSITY

BACKGROUND

1. Technical Field

The present invention relates to technology for printing images by forming dots on a printing medium.

2. Related Art

Printing devices that perform printing by using print heads while performing scans in main scanning direction and sub scanning direction include inkjet printers such as serial scan type printers, drum scan type printers, and the like. The inkjet printers form characters and images on printing media by ejecting inks from a plurality of nozzles of print heads.

One of dot recording modes employed by the inkjet printers is a mode referred to as "interlace mode". FIG. 27 is an illustration depicting how sub scan feed is performed in an interlace recording mode. A print head 1000 has four nozzles arranged in sub scanning direction. Numbers 0-3 indicated in circles are nozzle numbers. The nozzles are arranged at a pitch k of three dots in the sub scanning direction. Here, a unit of [dot] means a dot pitch [inch] in the sub scanning direction equivalent to a print resolution. Positions of the print head 1000 indicated as pass 1, pass 2, and so on in FIG. 27 represent positions in the sub scanning direction at the time of each main scan. Here, the "pass" means one main scan. After each main scan, a sub scan feed of a fixed feed amount L of four dots is executed.

However, positions of dots formed by each nozzle may sometimes be misaligned in some degree in the sub scanning direction due to manufacturing error of nozzle. A dot pattern Dtp1 of FIG. 27 is obtained under assumption that no such manufacturing error exists and all dot positions are normal. On the other hand, in case where dots formed by e.g. a first nozzle are misaligned upwards, there may be a space between a main scan line that has dots formed by the first nozzle and a main scan line that has dots formed by a zero nozzle, as shown in a dot pattern Dtp2 of FIG. 27. Such space may be observed by the naked eye as a portion of degraded image quality appearing as a streak, and is referred to as "banding". The banding may be attributed not only to the manufacturing error of nozzle but also to several factors including error in sub scan feed, warpage of printing paper, and the like.

In order to suppress such banding, a technique that performs correction by biasing density of each raster line is proposed (Patent Document 1). Specifically, in the example of the dot pattern Dtp2 of FIG. 27, the technique makes degradation of image quality appearing as a streak less noticeable by correcting and increasing densities of raster lines 6, 7 as well as by correcting and reducing densities of raster lines 4, 5. In JP-A-2005-219286, a technique that performs a smoothing process of correction value based on densities of a plurality of neighboring raster lines is further proposed.

Conventional techniques are under assumption that density of each raster line is reproduced accurately as long as no error exists in landing position of ink droplet, amount of ink, and the like. However, no consideration has been given to accuracy of density of each raster line in such case of no error. Furthermore, such problem has occurred not only as the problem of banding that is now becoming obvious, but also as a wider range of problem including irregularity of density, fidelity of color reproduction, and the like. In addition, such problem has been occurring not only in inkjet printers but also in laser printers.

SUMMARY

An advantage of some aspect of the invention is to provide a technique for reducing uneven print density in a halftone process.

According to an aspect of the invention, there is provided a printing method of printing on a printing medium. The method includes: generating dot data that represents state of dot formation at each print pixel of a print image to be formed on the printing medium by performing a halftone process on image data that represents an input tone value of each pixel making up an original image; and generating the print image by forming dots on each of the print pixels according to the dot data. The halftone process determines the state of dot formation by using a dither matrix that stores a plurality of threshold values, the plurality of threshold values being used for determining state of dot formation at each of print pixels of the print image to be formed on the printing medium according to an input tone value. The dither matrix is a matrix that stores each of the plurality of threshold values in each element such that a mutual difference in dot density formed at each predetermined print pixel group according to each input tone value falls within a predetermined range. The predetermined print pixel group is a cluster of plural print pixels corresponding to each of a plurality of element groups that are created by dividing the dither matrix into preset numbers of elements.

According to a printing device of the present invention, since dots can be formed such that difference in dot density formed at each predetermined print pixel group according to each input tone value falls within a predetermined range, a halftone process can be realized in such a way that reduces partial or local irregularity of density in a print image. Such reduction of density irregularity not only allows for improvement of fidelity of tone representation in a print image in monochromic printing and color printing, but also allows for reduction of deviation in hue by virtue of fidelity of density of each ink color. Here, the "dot density" means a product of a dot recording rate and a dot area, where the dot recording rate is a value obtained by dividing a number of dots formed by a number of pixels. Note that in case where plural sizes of dots are formed, the dot density is calculated by adding each product of a dot recording rate and a dot area with respect to each dot size.

Note that in techniques disclosed in JP-A-2005-236768 and JP-A-2005-269527 that employ intermediate data (number data) for specifying state of dot formation, the use of dither matrix in the present invention has a broader concept that also includes the use of conversion table (or correspondence relationship table) generated using a dither matrix. Such conversion table is not only generated directly from a dither matrix generated by a generation method of the present invention, but may sometimes be adjusted or modified as well, and such cases also fall under the category of dither matrix generated by the generation method of the present invention.

The invention also provides a density calibration method of generating correction data for calibrating image density printed on a printing medium. The method includes: generating dot data that represents state of dot formation, by using a dither matrix that stores a plurality of threshold values, the plurality of threshold values being used for determining state of dot formation at each of print pixels of a print image to be formed on a printing medium, according to calibration-use pattern data that includes uniform density image data generated by a uniform input tone value; forming dots on the printing medium according to the generated dot data; measuring density of the printed uniform density image with respect to each predetermined print pixel group; and generating correction data with respect to each predetermined region according to the measured density, the correction data including a correction value for reducing dispersion of density in the uniform density image. The program includes a program for causing the computer to determine the storage element such that a mutual difference in dot density formed among the plurality of predetermined print pixel groups according to each input tone value falls within a predetermined range. The predetermined print pixel group is a cluster of plural print pixels corresponding to each of a plurality of element groups that are created by dividing the dither matrix into preset numbers of elements.

In a density calibration method that employs a conventional dither matrix, there has been a problem of degradation in calibration precision since density had changed according to the positional relationship between an image of calibration-use pattern and a dither matrix. However, according to a density calibration method of the present invention, such change in density is reduced so that calibration precision can be enhanced.

The invention may also be reduced to practice in other forms, for example, a dither matrix, a dither matrix generating device, a printing device or printing method employing a dither matrix, a method of generating printed matter, a computer program for implementing the functions of such method or device by means of a computer, or a recording medium having such a computer program recorded thereon.

The use of a dither matrix in a printing device, printing method, or method of generating printed matter permits the dot on/off state of pixels to be determined through comparison on a pixel-by-pixel basis of threshold values established in the dither matrix to the tone values of image data; however, it would also be acceptable to determine the dot on/off state by comparing the sum of threshold value and tone value to a fixed value, for example. It would also be acceptable to determine dot on/off state according to tone values, and data created previously on the basis of threshold values, rather than using threshold values directly. Generally speaking, the dither method of the invention can be any method that permits dot on/off state to be determined according the tone values of pixels, and threshold values established at corresponding pixel locations in a dither matrix.

BRIEF DESCRIPTION OF THE DRAWINGS

FIG. 12 shows a matrix MG24 in which threshold values associated with the first to twenty-fifth greatest tendency to dot formation are stored and dots formed on each of 25 pixels that correspond to these elements.

FIG. 14 shows row-wise numbers of already determined threshold values and column-wise numbers of already determined threshold values.

FIG. 15 shows a state in which a dot that corresponds to a candidate storage element and dots that correspond to already determined threshold values are made on (dot pattern Dpa1).

FIG. 23 shows an illustration depicting a dither matrix M subjected to a grouping process in the embodiment.

FIG. 24 shows an illustration depicting four divided matrices M1-M4 in the embodiment.

FIG. 25 shows an illustration depicting four dot patterns formed on print pixels belonging respectively to first to fourth pixel groups, among elements storing the threshold values associated with the first to eighth greatest tendency to dot formation in a dither matrix M.

FIG. 26 shows an illustration depicting dot density matrices that correspond respectively to the four dot patterns.

DESCRIPTION OF EXEMPLARY EMBODIMENTS

The embodiments of the present invention will be described below in the following order, for the purpose of providing a clearer understanding of the operation and working effects of the present invention.

Figure 1:
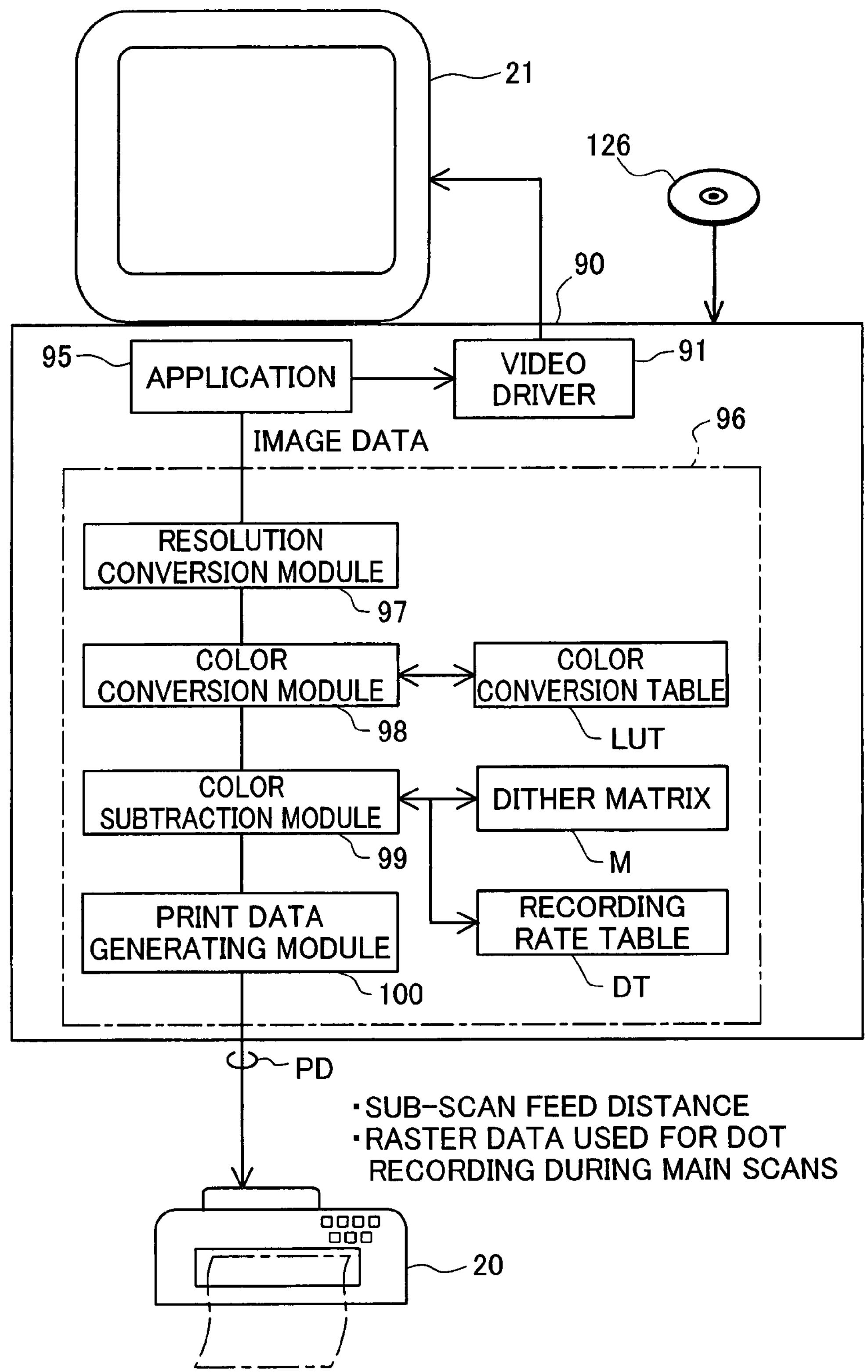
FIG. 1 is a block diagram illustrating the configuration of a printing system in the embodiments.

A. One Example of Printing System Configuration:

B. Production of Density Irregularity Due to Conventional Dither Matrix:

C. Method of Dither Matrix Generation in First Embodiment of Present Invention:

D. Method of Dither Matrix Generation in Second Embodiment of Present Invention:

E. Method of Dither Matrix Generation in Third Embodiment of Present Invention:

F. Modifications:

A. Configuration of Printing System in the Embodiments:

FIG. 1 is a block diagram illustrating the Configuration of a printing system in the embodiments. This printing system is furnished with a computer 90 as a printing control device, and a color printer 20 as a print unit. The color printer 20 and the computer 90 can be termed a "printing device" in the broad sense.

On the computer 90, an application program 95 runs on a prescribed operating system. The operating system incorporates a video driver 91 and a printer driver 96; print data PD for transfer to the color printer 20 is output from the application program 95 via these drivers. The application program 95 performs the desired processing of images targeted for processing, as well as outputting images to a CRT 21 via the video driver 91.

Within the printer driver 96 are a resolution conversion module 97 for converting the resolution of an input image to the resolution of the printer; a color conversion module 98 for color conversion from RGB to CMYK; a halftone module 99 that, using an error diffusion method and/or the dither matrices M generated in the embodiments to be discussed later, performs halftone process of input tone values and transform them into output tone values representable by forming dots; a print data generating module 100 that uses the halftone data for the purpose of generating print data to be sent to the color printer 20; a color conversion table LUT serving as a basis for color conversion by the color conversion module 98; and a recording rate table DT for determining recording rates of dots of each size, for the halftone process. The printer driver 96 corresponds to a program for implementing the function of generating the print data PD. The program for implementing the functions of the printer driver 96 is provided in a format recorded on a computer-readable recording medium. Examples of such a recording medium are a CD-ROM 126, flexible disk, magneto-optical disk, IC card, ROM cartridge, punch card, printed matter having a bar code or other symbol imprinted thereon, a computer internal memory device (e.g. RAM, ROM, or other memory) or external memory device, or various other computer-readable media.

Figure 2:
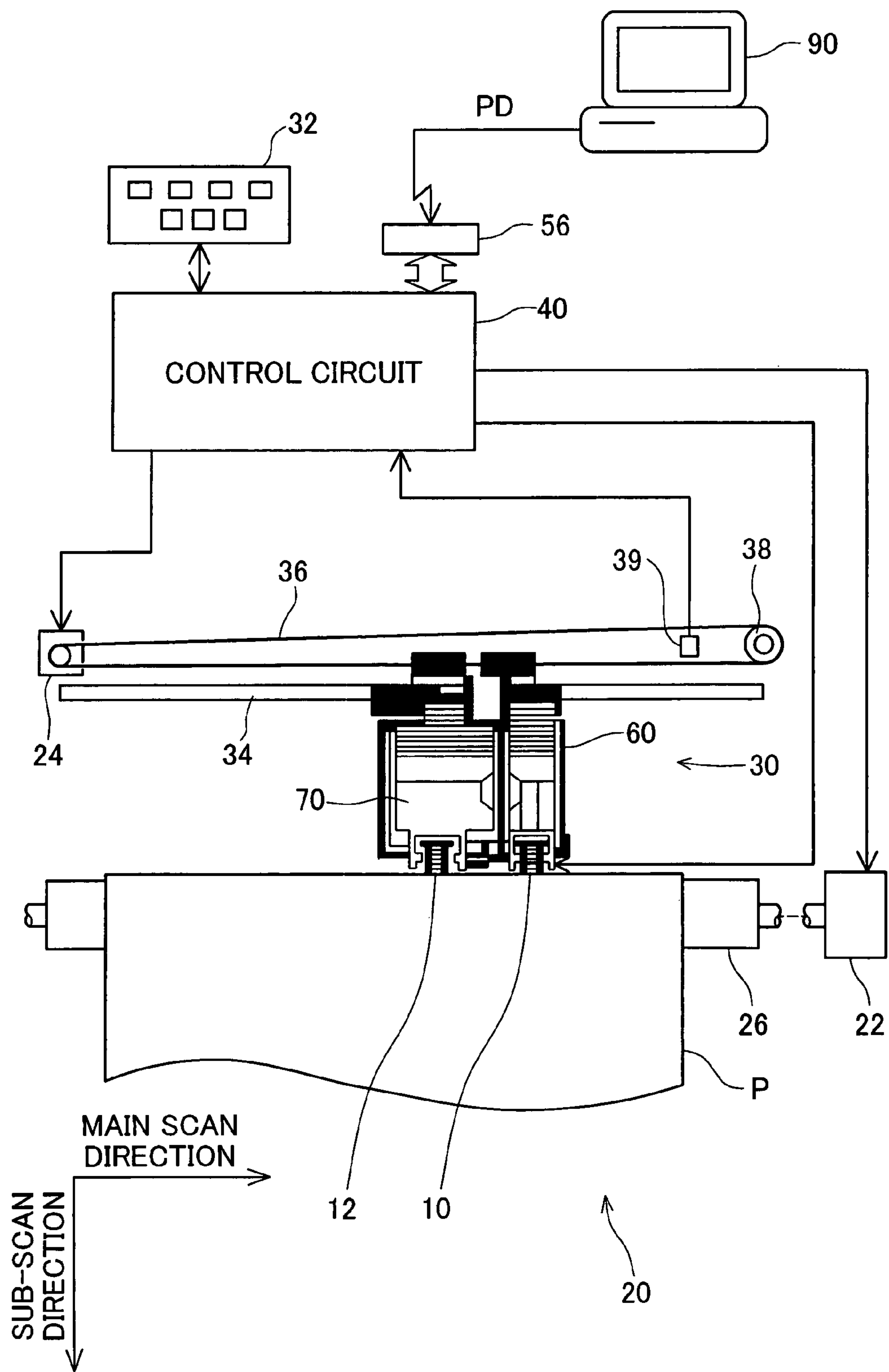
FIG. 2 is a schematic illustration of a color printer 20.

FIG. 2 is a schematic illustration of the color printer 20. The color printer 20 is equipped with a sub-scan driving portion for transporting printing paper P in the sub-scanning direction by means of a paper feed motor 22; a main scan driving portion for reciprocating a carriage 30 in the axial direction of a paper feed roller 26 (main scanning direction) by means of a carriage motor 24; a head drive mechanism for driving a print head unit 60 installed on the carriage 30 (also termed the "print head assembly") and controlling ink ejection and dot formation; and a control circuit 40 for exchange of signals with the paper feed motor 22, the carriage motor 24, the print head unit 60 equipped with the print heads 10, 12, and a control panel 32. The control circuit 40 is connected to the computer 90 via a connector 56.

Figure 3:
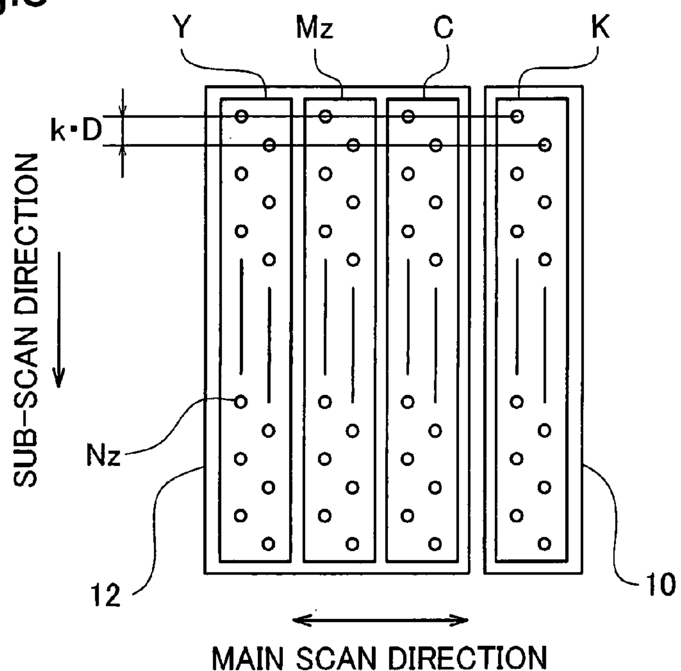
FIG. 3 is an illustration of a nozzle arrangement on the lower face of print heads 10, 20.

FIG. 3 is an illustration of the nozzle arrangement on the lower face of the print heads 10, 12. On the lower face of the print head 10 there are formed a black ink nozzle group K for ejecting black ink, a cyan ink nozzle group C for ejecting cyan ink, a magenta ink nozzle group Mz for ejecting magenta ink, and a yellow ink nozzle group Y for ejecting yellow ink.

The plurality of nozzles contained in each nozzle group are respectively lined up at a constant nozzle pitch k·D, in the sub-scan direction. Here, k is an integer, and D represents pitch equivalent to the print resolution in the sub-scan direction (also termed "dot pitch"). This will also referred to herein as "the nozzle pitch being k dots." The "dot" unit means the dot pitch of the print resolution. Similarly, sub-scan feed distance is also expressed in "dot" units.

Each nozzle Nz is provided with a piezo element (described later) for the purpose of driving the nozzle Nz and ejecting drops of ink. During printing, ink drops are ejected from the nozzles as the print heads 10, 12 are scanned in the main scanning direction MS.

Figure 4:
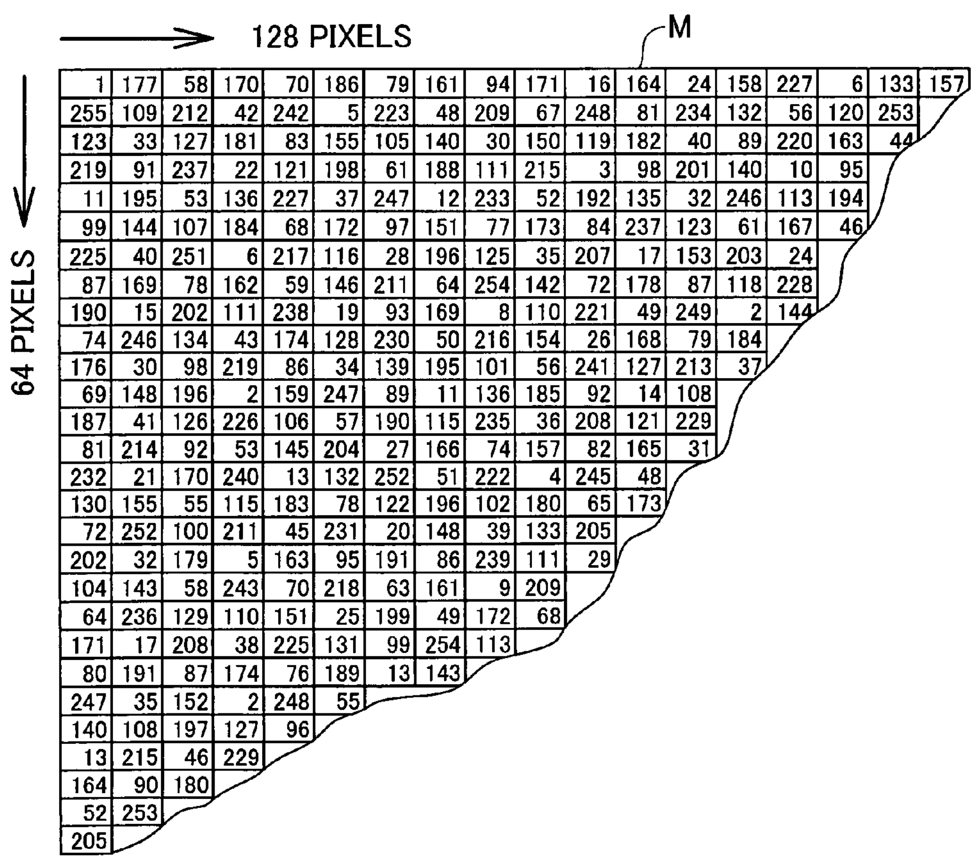
FIG. 4 shows an illustration depicting conceptually part of an exemplary dither matrix.

FIG. 4 shows an illustration depicting conceptually part of an exemplary dither matrix M. The illustrated dither matrix contains threshold values selected evenly from a tone value range of 1 to 255, stored in a total of 16384 elements, i.e. 128 elements in the horizontal direction (main scanning direction) and 64 elements in the vertical direction (sub-scan direction). The size of the dither matrix M is not limited to that shown by way of example in FIG. 4; various other sizes are possible, including matrices having identical numbers of horizontal and vertical elements.

Figure 5:
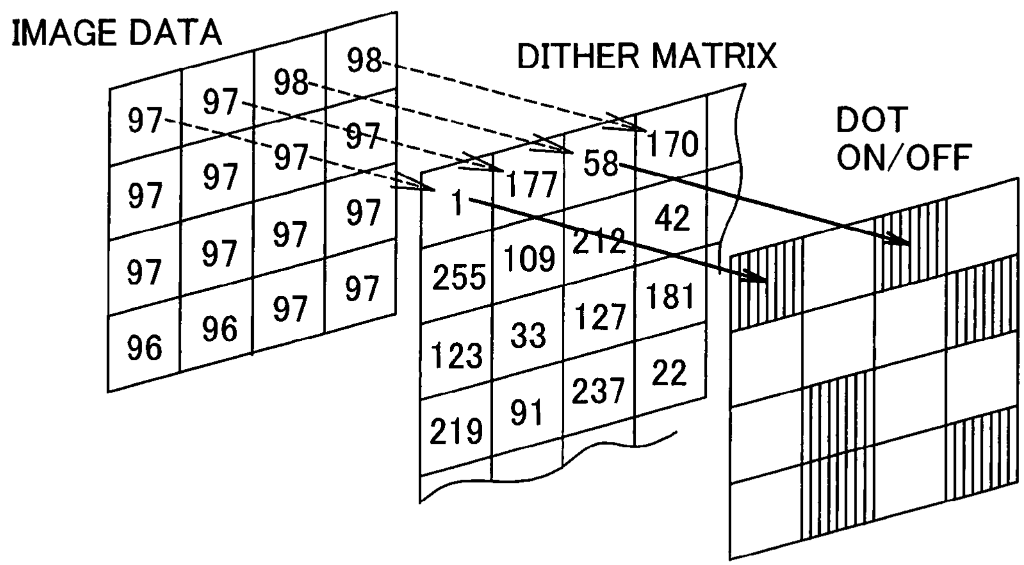
FIG. 5 shows an illustration depicting the concept of dot on/off states using a dither matrix.

FIG. 5 shows an illustration depicting the concept of dot on/off states using a dither matrix. For convenience in illustration, only a portion of the elements are shown. As depicted in FIG. 5, when determining dot on-off states, tone values contained in the image data are compared with the threshold values saved at corresponding locations in the dither matrix. In the event that a tone value contained in the image data is greater than the corresponding threshold value stored in the dither table, a dot is formed; if the tone value contained in the image data is smaller, no dot is formed. Pixels shown with hatching in FIG. 5 signify pixels targeted for dot formation. By using a dither matrix in this way, dot on-off states can be determined on a pixel-by-pixel basis, by a simple process of comparing the tone values of the image data with the threshold values established in the dither matrix, making it possible to carry out the tone number conversion process rapidly. Furthermore, once image data tone values have been determined, decisions as to whether to form dots on pixels will be made exclusively on the basis of the threshold values established in the matrix, and from this fact it will be apparent that with a systematic dither process it is possible to actively control dot production conditions by means of the threshold value storage locations established in the dither matrix.

Since with a systematic dither process it is possible in this way to actively control dot production conditions by means of the storage locations of the threshold values established in the dither matrix M, a resultant feature is that dot dispersion and other picture qualities can be controlled by means of adjusting the settings of the threshold value storage locations. This means that by means of a dither matrix optimization process, it is possible to optimize the halftoning process for a wide variety of target states.

Figure 6:
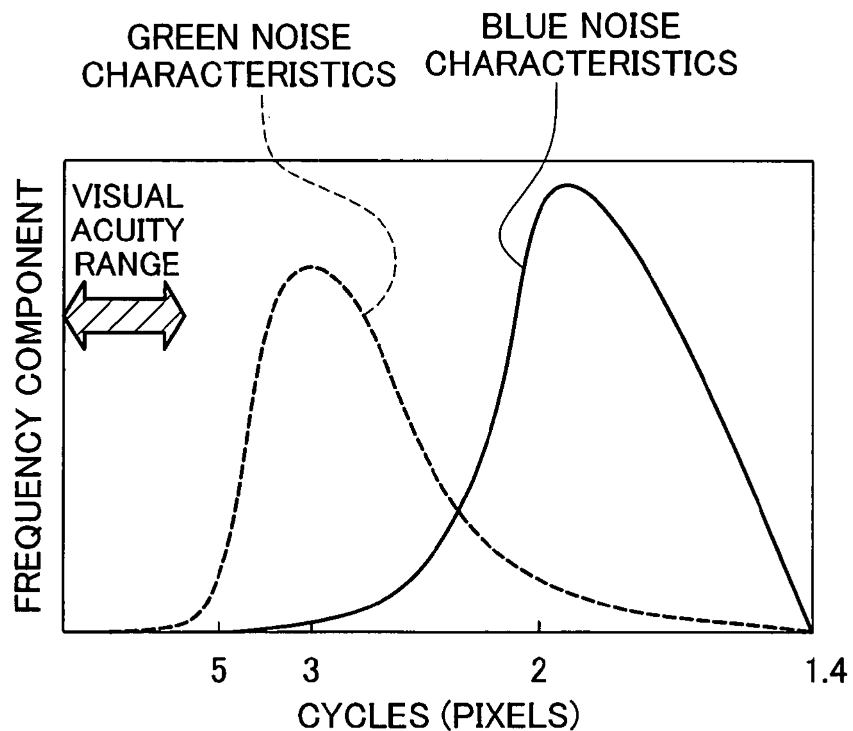
FIG. 6 shows an illustration depicting conceptually exemplary spatial frequency characteristics of threshold values established at pixels in a blue noise dither matrix having blue noise characteristics.

FIG. 6 shows an illustration depicting conceptually exemplary spatial frequency characteristics of threshold values established at pixels in a blue noise dither matrix having blue noise characteristics, by way of a simple example of adjustment of dither matrix. The spatial frequency characteristics of a blue noise dither matrix are characteristics such that the length of one cycle has the largest frequency component in a high frequency region of close to two pixels. These spatial frequency characteristics have been established in consideration of the characteristics of human visual perception. Specifically, a blue noise dither matrix M is a dither matrix in which, in consideration of the fact that human visual acuity is low in the high frequency region, the storage locations of threshold values have been adjusted in such a way that the largest frequency component is produced in the high frequency region.

FIG. 6 also shows exemplary spatial frequency characteristics of a green noise matrix M, indicated by the broken line curve. As illustrated in the drawing, the spatial frequency characteristics of a green noise dither matrix are characteristics such that the length of one cycle has the largest frequency component in an intermediate frequency region of from two to ten or so pixels. Since the threshold values of a green noise dither matrix are established so as to produce these sorts of spatial frequency characteristics, if dot on/off states of pixels are decided while looking up in a dither matrix having green noise characteristics, dots will be formed adjacently in units of several dots, while at the same time the clusters of dots will be formed in a dispersed pattern overall. For printers such as laser printers, with which it is difficult to consistently form fine dots of about one pixel, by means of deciding dot on/off states of pixels through lookup in such a green noise matrix it will be possible to suppress formation of "orphan" dots. As a result, it will be possible to output images of consistently high quality at high speed. In other words, a dither matrix adapted for lookup to decide dot on/off states in a laser printer or similar printer will contain threshold values adjusted so as to have green noise characteristics.

Figure 7:
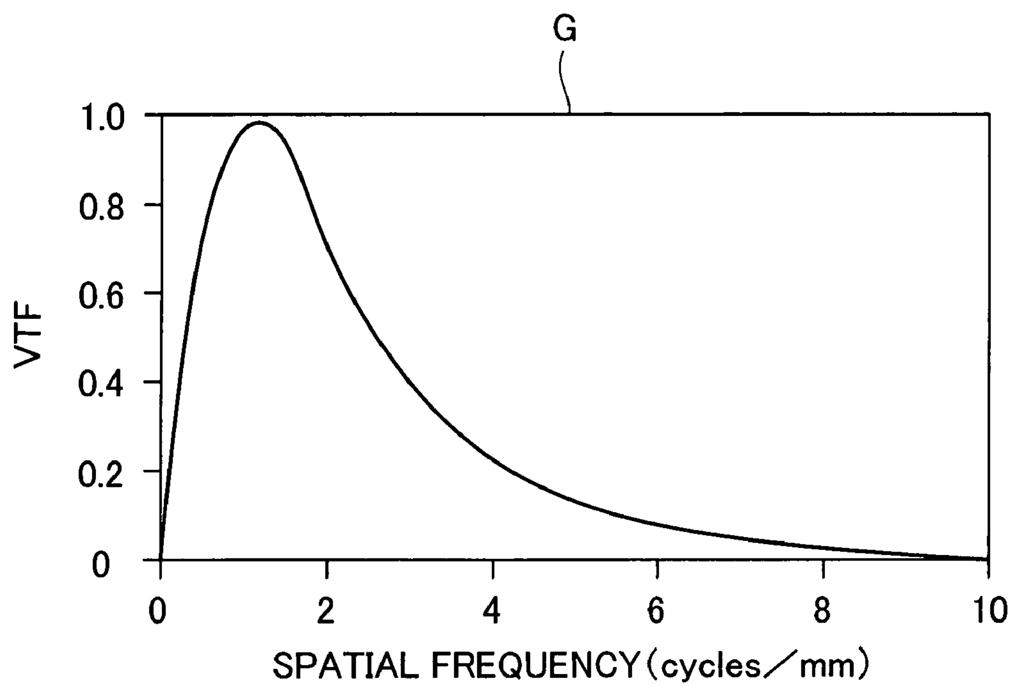
FIG. 7 shows a conceptual illustration of a visual spatial frequency characteristic VTF (Visual Transfer Function) representing acuity of the human visual faculty with respect to spatial frequency.

FIG. 7 shows conceptual illustrations of a visual spatial frequency characteristic VTF (Visual Transfer Function) representing human visual acuity with respect to spatial frequency. Through the use of a visual spatial frequency characteristic VTF it will be possible to quantify the perception of graininess of dots apparent to the human visual faculty following the halftone process, by means of modeling human visual acuity using a transfer function known as a visual spatial frequency characteristic VTF. A value quantified in this manner is referred to as a graininess index. Formula F1 gives a typical experimental equation representing a visual spatial frequency characteristic VTF. In Formula F1 the variable L represents observer distance, and the variable u represents spatial frequency. Formula F2 gives an equation defining a graininess index. In Formula F2 the coefficient K is a coefficient for matching derived values with human acuity.

Such quantification of graininess perception by the human visual faculty makes possible fine-tuned optimization of a dither matrix for the human visual system. Specifically, a Fourier transform can be performed on a dot pattern hypothesized when input tone values have been input to a dither matrix, to arrive at a power spectrum FS; and a graininess evaluation value that can be derived by integrating all input tone values after multiplying the power spectrum FS with the visual spatial frequency characteristic VTF (Formula F2) can be utilized as a evaluation coefficient for the dither matrix. In this example, the aim is to achieve optimization by adjusting threshold value storage locations to minimize the dither matrix evaluation coefficient.

The feature that is common to such dither matrices established in consideration of the characteristics of human visual perception such as the blue noise matrix and the green noise matrix is that, on a printing medium, an average value of components within a specified low frequency range is set small, where the specified low frequency range is a spatial frequency domain within which visual sensitivity of human is at a highest level and ranges from 0.5 cycles per millimeter to 2 cycles per millimeter with a central frequency of 1 cycle per millimeter. For example, the inventors have ascertained that, by configuring a matrix to have such a frequency characteristic that the average value of components within the specified low frequency range is smaller than an average value of components within another frequency range, where the another frequency range is a domain within which visual sensitivity of human is reduced to almost zero and ranges from 5 cycles per millimeter to 20 cycles per millimeter with a central frequency of 10 cycles per millimeter, it is possible to reduce granularity in a domain within which visual sensitivity of human is at a high level, thereby effectively improving image quality with a focus on visual sensitivity of human.

However, in conventional dither matrices, although dispersion of dots and fidelity of tone representation have been considered in a global scale, however, partial or local fidelity of tone representation has not been considered.

Figure 8:
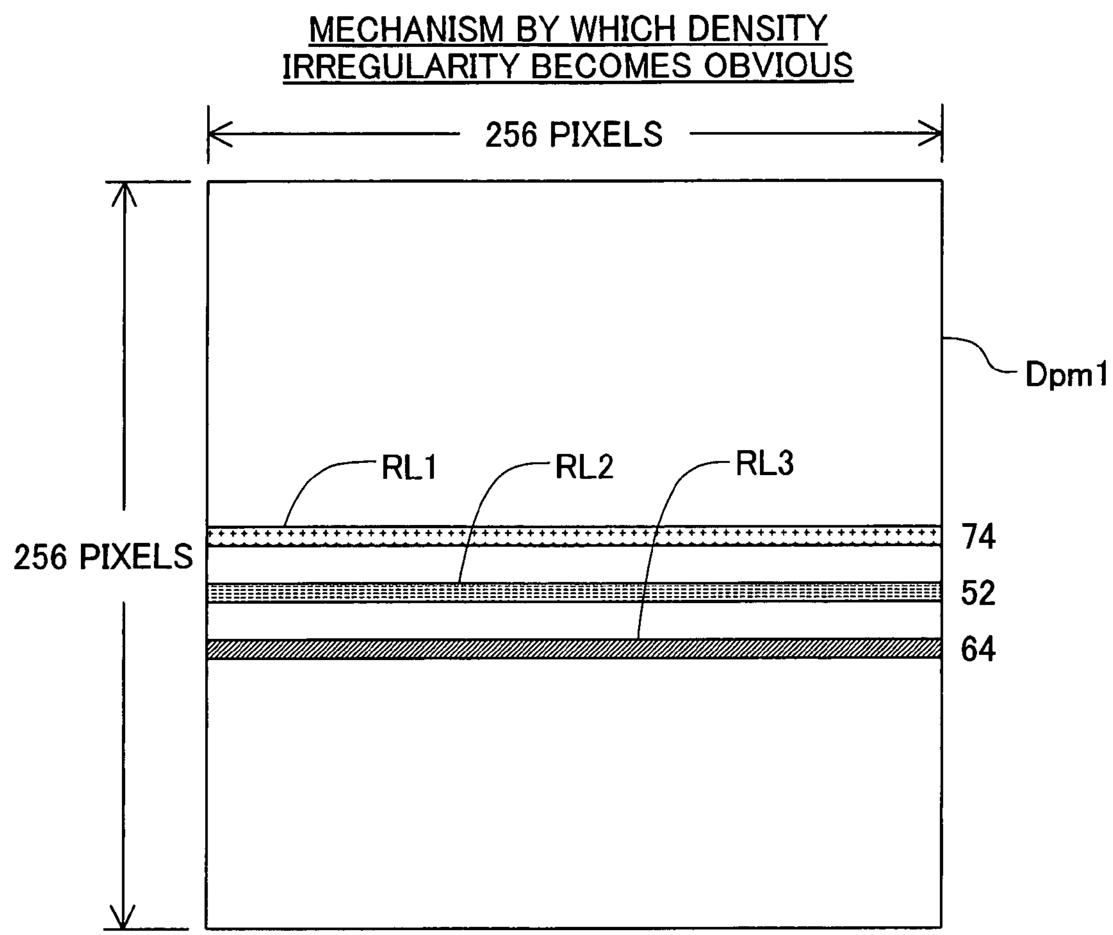
FIG. 8 shows a mechanism by which local density irregularity is produced due to use of a conventional dither matrix.

B. Production of Density Irregularity Due to Conventional Dither Matrix:

FIG. 8 is an illustration depicting a mechanism by which local density irregularity is produced due to use of a conventional dither matrix. In FIG. 8, a dot pattern Dpm1 formed by using a dither matrix M is shown. Here, suppose an input tone value is 64, i.e. a value equivalent to 25% of a maximum tone value, then a number of dots that should be formed on each raster line is 64. However, by focusing attention on three lines RL1, RL2, RL3 in main scanning direction, numbers of dots formed on these lines are 74, 52, and 64, respectively. These dots correspond to tone values of 74, 52, and 64, respectively. The reason such deviation in tone has occurred is that the conventional dither matrix is generated in consideration of global fidelity of tone representation, rather than local fidelity of tone representation.

Such deviation in tone on each raster line has become obvious as banding, in combination not only with manufacturing error of nozzle (error in ink flight direction, error in ink amount, and the like), but also with factors such as error in sub scan feed and warpage of printing paper. On the other hand, the local irregularity of density has also occurred as unexplained irregularity of density, hue, and the like in a portion that should be monotone under normal conditions.

Figure 9:
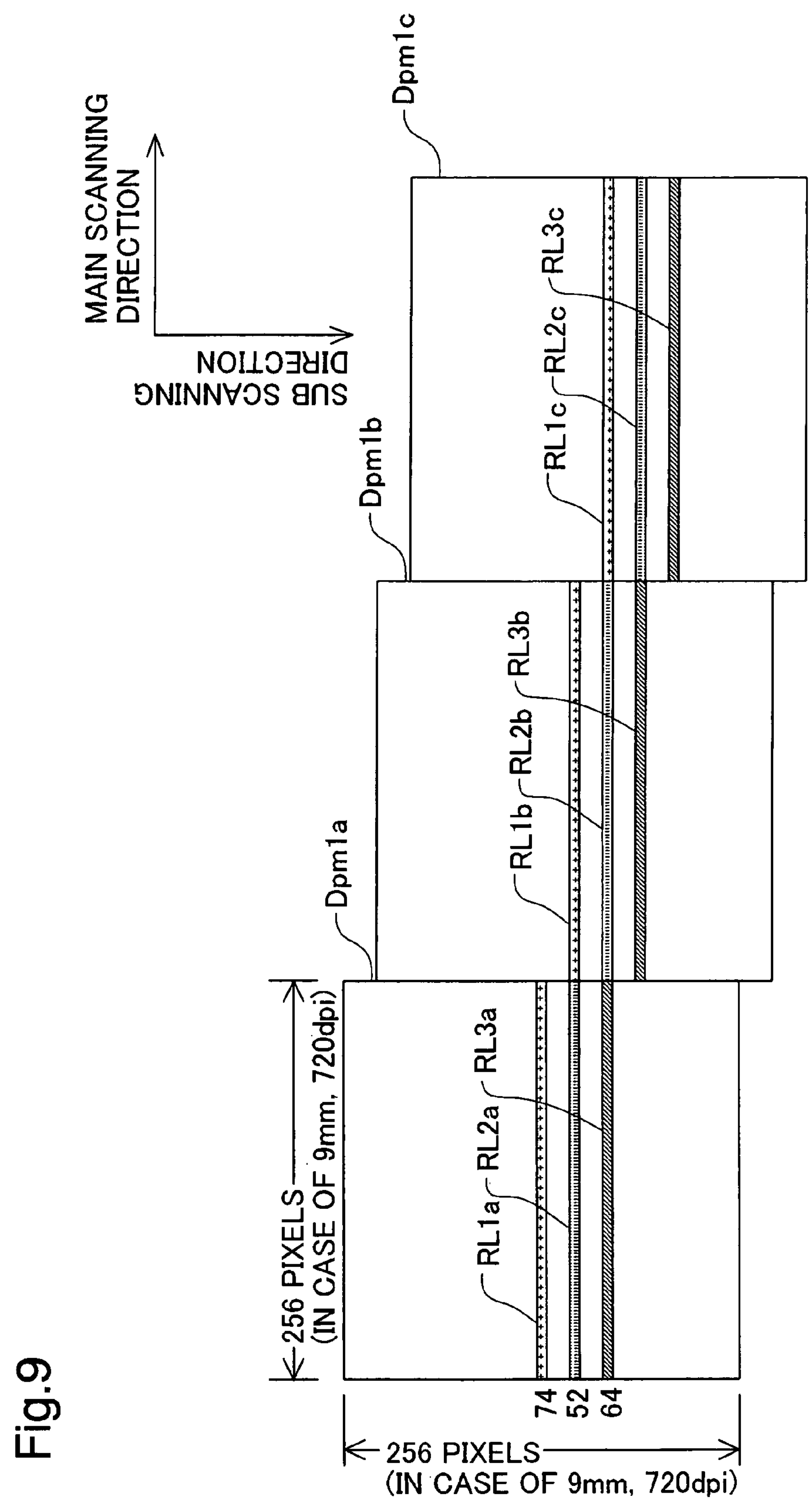
FIG. 9 shows dot patterns subjected to a halftone process which uses a plurality of conventional dither matrices arranged with shifts in sub scanning direction.

FIG. 9 is an illustration showing dot patterns subjected to a halftone process which uses a plurality of conventional dither matrices arranged with shifts in sub scanning direction. Such shifts of dither matrices are made for the purpose of, for example, reducing low frequency noises that may be produced in cycles of the dither matrix arrangement and thereby improving image quality. The reason the low frequency noises are produced in cycles of the dither matrix arrangement is that performing a halftone process using the same dither matrix and the same tone value may cause dots to be formed at the same position in the dither matrix.

As can be seen from FIG. 9, nine lines in main scanning direction RL1*a*, RL2*a*, RL3*a*, RL1*b*, RL2*b*, RL3*b*, RL1*c*, RL2*c*, and RL3*c* included in three dot patters Dpm1*a*, Dpm1*b*, and Dpm1*c* are connected at positions deviated from each other in the sub scanning direction. For example, the raster line RL3*a* of the dot pattern Dpm1*a* is connected with the raster line RL2*b* of the dot pattern Dpm1*b* and the raster line RL1*c* of the dot pattern Dpm1*c*. Meanwhile, since the lines in the main scanning direction RL3*a*, RL2*b*, and RL1*c* respectively represent densities corresponding to tone values of 64, 52, and 74, it is found that there is irregularity of density produced on a single raster line. Such irregularity of density cannot be solved by such a technique as disclosed in JP-A-2005-219286 which applies a process of density correction to every single raster line.

The inventors of the present application successively unlocked the mechanism of density irregularity production and created an invention for solving such problem. The present invention is disclosed by each embodiment which will be described later. Furthermore, the inventors of the present application ascertained that the mechanism of density irregularity production also works similarly in printers that form dots on printing media while performing sub scanning of paper feed, such as line printers, well-known LED printers, and the like, to appear as density irregularity on each sub scan line. Note that in such printers, the scanning (paper feed) is performed only in the main scanning direction in FIG. 9.

Furthermore, since in such printers, dither matrices are arranged with shifts in sub scanning direction for the purpose of improving image quality as shown in FIG. 9, density of each sub scan line i.e. a cluster of dots neighboring in the sub scanning direction may change depending on its position of sub scan. The reduction of density irregularity in this way can prevent the density of each sub scan line from being changed depending on its position of sub scan, thereby significantly improving image quality.

C. Method of Dither Matrix Generation in First Embodiment of Present Invention

Figure 10:
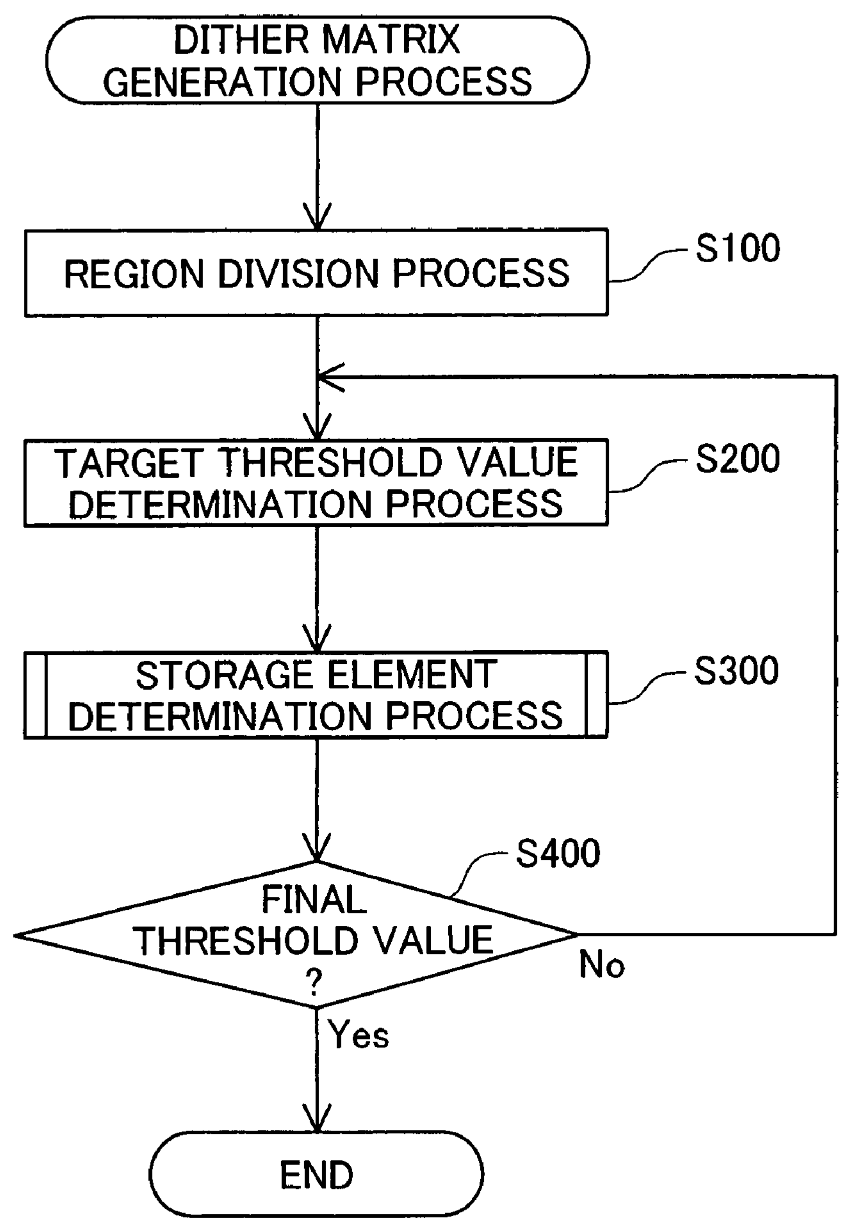
FIG. 10 is a flowchart showing the processing routine of a method of dither matrix generation in a first embodiment of the present invention.

FIG. 10 is a flowchart showing the processing routine of a method of dither matrix generation in a first embodiment of the present invention. In this example, a small dither matrix of 10 rows and 10 columns is generated for ease of explanation. A graininess index (Formula F2, FIG. 7) is used as an evaluation for representing optimality of dither matrix.

In step S100, a region division process is performed. The region division process is a process of dividing a dither matrix into a predetermined plural regions for the purpose of reducing local irregularity of density. Details of this process will be described later. Each of the plural regions is composed as a group of elements including a plurality of elements. Note that in the present embodiment, the group of elements corresponds to "each of a plurality of element groups" in the scope of claim for patent.

In step S200, a target threshold value determination process is performed. The target threshold value determination process is a process of determining a threshold value that is targeted for determination of storage element. In the present embodiment, the determination of threshold value is performed by selecting threshold values in ascending order, i.e. in order of decreasing tendency to dot formation. Selecting threshold values in order of decreasing tendency to dot formation allows threshold values to have its storage elements determined in order of decreasing conspicuity of dot graininess, i.e. level of highlight, of regions for which the threshold values are used to control dot arrangements. It is thus possible to provide greater degrees of design freedom to highlight regions having conspicuous dot graininess.

In step S300, a storage element determination process is performed. The storage element determination process is a process of determining an element for storing a target threshold value. A dither matrix is generated by alternately repeating these target threshold value determination process (step S200) and storage element determination process (step S300). The target threshold value may be all threshold values, or alternatively be a part of threshold values.

Figure 11:
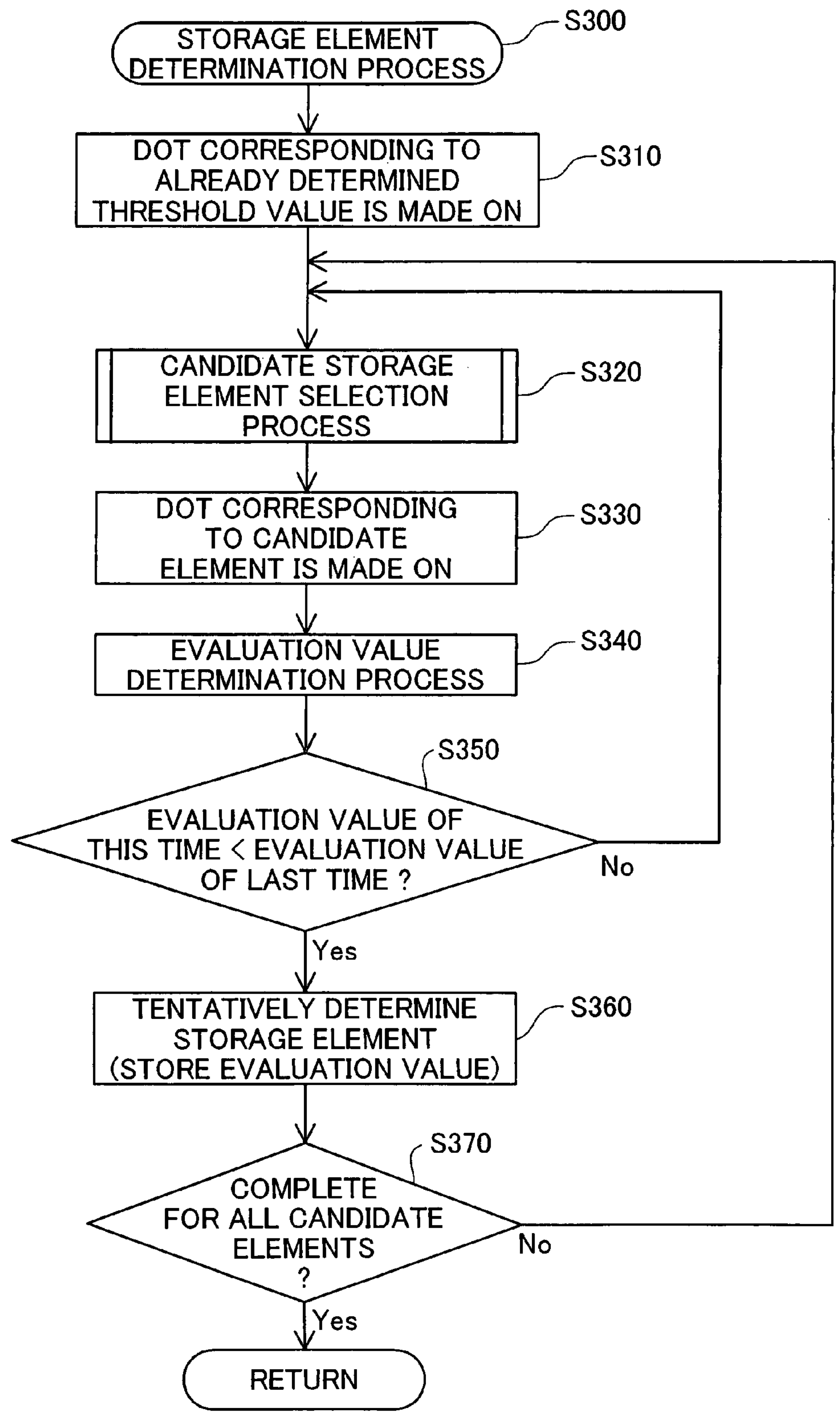
FIG. 11 is a flowchart showing the processing routine of a storage element determination process in the first embodiment of the present invention.

FIG. 11 is a flowchart showing the processing routine of a storage element determination process in the first embodiment of the present invention. In step S310, each dot that corresponds to an already determined threshold value is made on. The already determined threshold value indicates a threshold value for which a storage element is determined. In the present embodiment, since threshold values are selected in order of decreasing tendency to dot formation as described above, at the time when a dot that corresponds to a target threshold value is formed, every pixel that corresponds to an element storing an already determined threshold value will have a dot formed thereon. To the contrary, in case where an input tone value is a minimum value that allows for formation of dot in association with a target threshold value, any pixel that corresponds to an element other than those storing already determined threshold values will not have a dot formed thereon.

FIG. 12 is an illustration depicting a matrix MG24 in which threshold values (from 0 to 24) associated with the first to twenty-fifth greatest tendency to dot formation are stored and dots formed on each of 25 pixels that correspond to these elements. A dot pattern Dpa thus configured is used to determine on which pixel a twenty-sixth dot is to be formed.

In step S320, a candidate storage element selection process is performed. The candidate storage element selection process is a process of selecting a candidate storage element in such a way that prevents variation in number of dots formed on each print pixel group corresponding to each element group described above from becoming too large.

Figure 13:
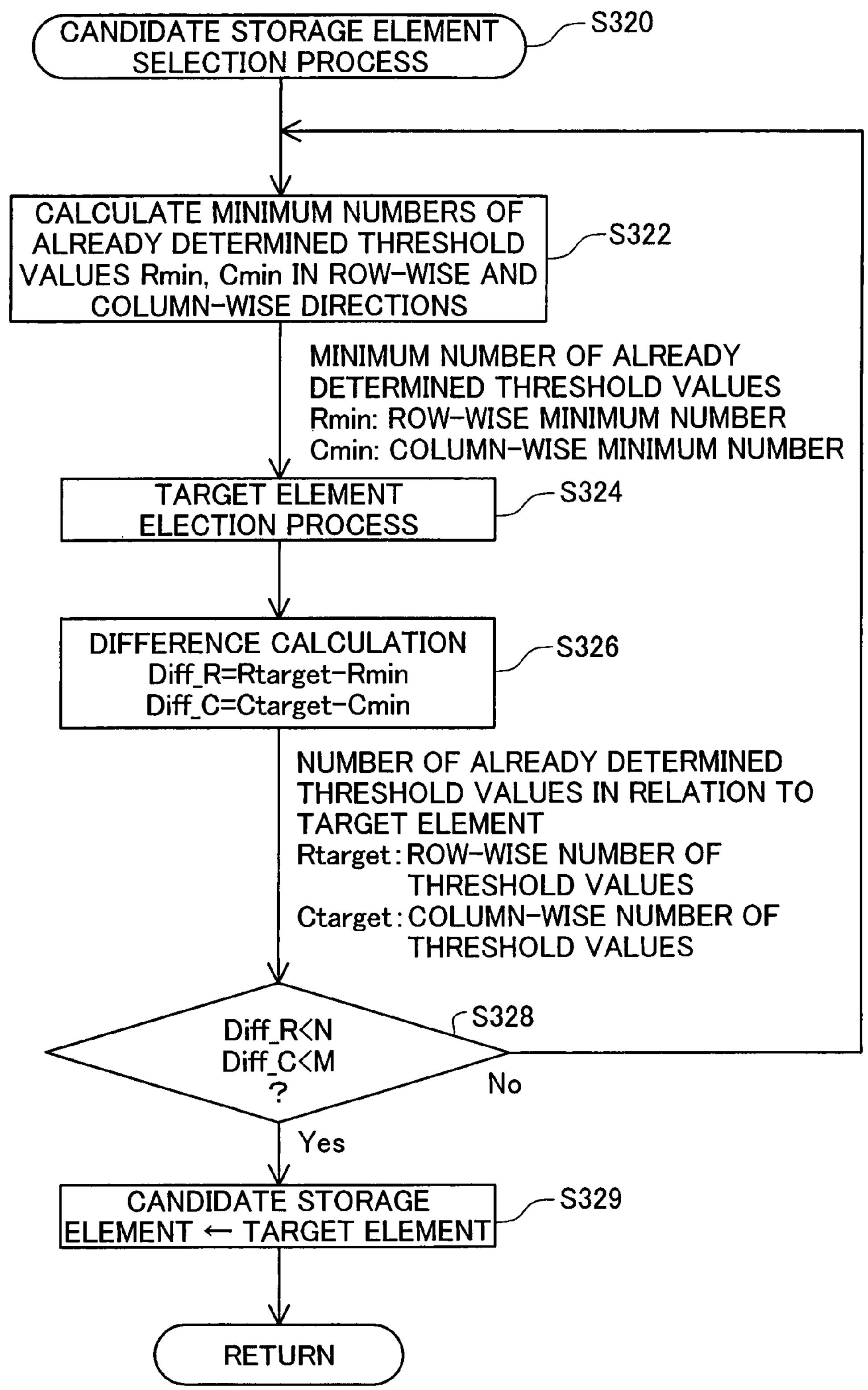
FIG. 13 is a flowchart showing the processing routine of a candidate storage element selection process in the first embodiment of the present invention.

FIG. 13 is a flowchart showing the processing routine of a candidate storage element selection process in the first embodiment of the present invention. In step S322, a row-wise minimum number Rmin which is a minimum number of already determined threshold values in the row-wise direction of the dither matrix M and a column-wise minimum number Cmin which is a minimum number of already determined threshold values in the column-wise direction of the dither matrix M are calculated.

FIG. 14 is an illustration showing row-wise numbers of already determined threshold values and column-wise numbers of already determined threshold values. As can be seen from FIG. 14, three threshold values of 17, 19, and 12 are stored in each element in the first column; whereas only one threshold value of 16 is stored in each element in the fourth column. On the other hand, three threshold values of 17, 7, and 14 are stored in each element in the first row; whereas two threshold values of 1 and 24 are stored in each element in the second row. Based on these respective numbers of already determined threshold values, the number of threshold values "1" in the fourth column is determined as the column-wise minimum number Cmin, and the number of threshold values "2" in the second row and the like is determined as the row-wise minimum number Rmin.

In step S324, a target element selection process is performed. The target element selection process is a process of selecting storage elements, in which already determined threshold values are not stored, in a predetermined order. In the present embodiment, storage elements are selected on a column-by-column basis starting from the first column. For example, an element in the second column of the first row attached with a mark "*1" is selected as a first target pixel, followed by an element in the third column of the first row (*2), an element in the fourth column of the first row (*3), and so on.

In step S326, a difference calculation process is performed. The difference calculation process is a process of calculating a row-wise difference value Diff_R between a row-wise number of already determined threshold values Rtarget in the row the target element belongs and the row-wise minimum number Rmin and a column-wise difference value Diff_C between a column-wise number of already determined threshold values Ctarget and the column-wise minimum number Cmin. For example, in case where the target element is an element in the second column of the first row, the row-wise number of already determined threshold values Rtarget is "3" and the row-wise minimum number Rmin is "2", so that the row-wise difference value Diff_R is "1". On the other hand, the column-wise number of already determined threshold values Ctarget is "3" and the column-wise minimum number Cmin is "1", so that the column-wise difference value Diff_C is "2".

In step S328, a determination is made as to whether or not both the column-wise difference value Diff_C and the row-wise difference value Diff_R are less than respective predetermined criterion values. As a result of the determination, if the row-wise difference value Diff_R is less than a criterion value N and the column-wise difference value Diff_C is less than a criterion value M, the control of the process is passed to step S329. On the other hand, if any one of the difference values is equal to or greater than its corresponding criterion value, then the control of the process is returned to step S322. For example, in case where both the criterion values N, M are "1", it is found that elements such as the one in the second column of the first row and the one in the third column of the first row will result in difference values of equal to or greater than the criterion value but the element in the fourth column of the first row will result in a difference value of less than the criterion value.

In step S329, the target element is replaced by the candidate storage element. In this way, only those elements that give a difference value, i.e. a difference between a number of already determined threshold values of the row and the column to which the target element belongs and a minimum number of threshold values of the row and column, of less than a criterion value will be selected as the storage element. Specifically, irrespective of row number, only those elements that respectively belong to the fourth column, seventh column, ninth column, and tenth column (elements with hatchings) will be selected as the candidate storage element. Once step S329 is complete, the control of the process is returned to step S330 (FIG. 11).

In step S330, a dot that corresponds to the candidate storage element is made on. This process is performed in such a way that adds a dot to a group of dots that were made on in step S310 as dots that correspond to already determined threshold values.

Figures 16, 17:
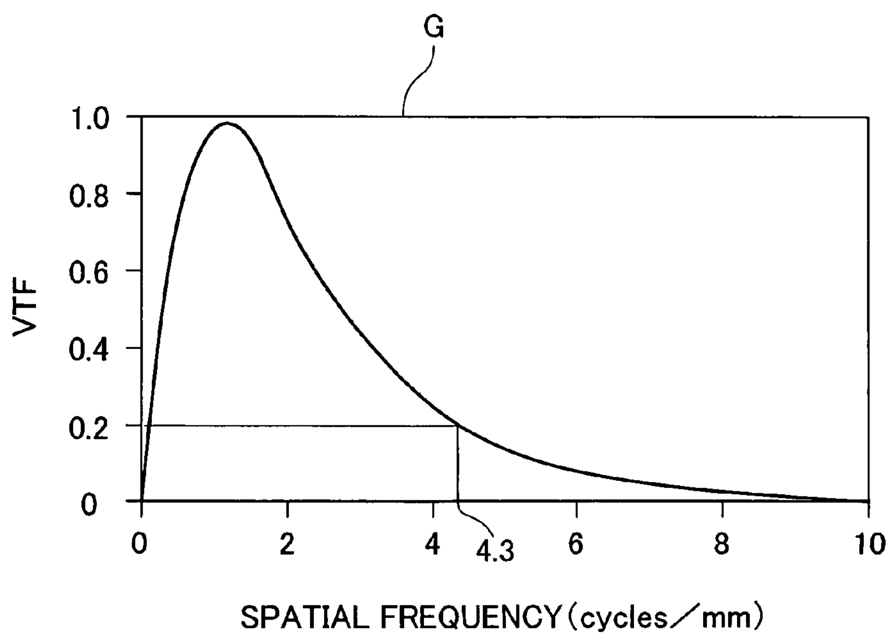
FIG. 16 shows a dot density matrix Dda1 that represents a dot density in a quantitative manner.
FIG. 17 shows a guideline for determining a target of a region division process in a second embodiment of the present invention.

FIG. 15 is an illustration depicting a state in which a dot that corresponds to the candidate storage element and dots that correspond to the already determined threshold values are made on (dot pattern Dpa1). Here, the candidate storage element is an element in the seventh column of the first row. FIG. 16 is an illustration depicting a matrix that digitizes this state, that is to way, a dot density matrix Dda1 that represents a dot density in a quantitative manner is depicted. The numeral "0" indicates no dot has been formed; whereas the numeral "1" indicates a dot has been formed (including the case where a dot is assumed to be formed in the candidate storage element).

In step 340, an evaluation value determination process is performed. The evaluation value determination process is a process of calculating a graininess index as an evaluation value, based on this dot density matrix (FIG. 16). The graininess index can be calculated by using a computational equation shown in FIG. 7. Note that the graininess index regarding the above-described predetermined element group may also be included in the evaluation value.

In step S350, the graininess index calculated this time is compared to the graininess index calculated last time (stored in a buffer not shown). As a result of the comparison, if the graininess index calculated this time is smaller (more preferable), then the buffer is stored (updated) with the graininess index of this time in association with the candidate storage element, and the candidate storage element of this time is tentatively considered as the storage element (step S360).

Such process is performed for every candidate element, and a candidate storage element that is stored in the buffer (not shown) in the final stage is determined as the storage element (step S370). Furthermore, such process is performed for every threshold value or alternatively for every threshold value within a preset range, thereby completing the dither matrix generation process (step S400, FIG. 10).

As described above, in the first embodiment, since difference in number of dots formed in each row and each column according to each tone value is restricted within a predetermined range, it is possible to reduce local density irregularity and thereby enhance image quality. Furthermore, since density error of each raster line is reduced, there is also an advantage of suppressing banding.

Note that in the present embodiment, the graininess index corresponds to the "matrix evaluation value that represents correlation to a predetermined target state" in the scope of claim for patent. Meanwhile, in the present embodiment, the "predetermined target state" means that the graininess index of state of dot formation is small.

D. Method of Dither Matrix Generation in Second Embodiment of Present Invention:

FIG. 17 is an illustration showing a guideline for determining a target of a region division process in a second embodiment of the present invention. The guideline is quantified by a VTF function by using human visual perception as a criterion. For example, suppose a print resolution is 720 DPI and a value that makes the VTF function to be 0.2 is used as the criterion, then it is found that a matrix can be divided into regions of 6 pixel size ($<6.59=720/(4.3\times25.4)$).

Figure 18:
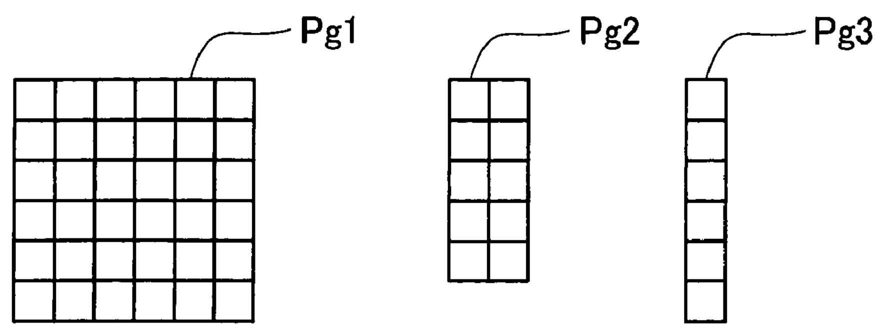
FIG. 18 shows examples of element groups that were established based on the guideline of the second embodiment of the present invention.

FIG. 18 is an illustration showing examples of element groups that were established based on the above-described guideline. An element group Pg1 is configured as an element group of 6 rows and 6 columns; an element group Pg2 is configured as an element group of 5 rows and 2 columns; and an element group Pg3 is configured as an element group of 6 rows and 1 column, respectively. Although in this example, both row-wise size and column-wise size of each element group are within 6 pixels; however, only one of row-wise size and column-wise size may be within 6 pixels, such as the element group of 1 pixel row and 256 pixels column as in the first embodiment.

As described above, the inventors of the present application discovered to use human visual perception also as a criterion for the guideline of dither matrix division process. Based on such criterion, the inventors of the present invention discovered that determining, according to a size of the print pixel, a number of elements belonging to each of the plurality of divided regions such that change of size of print pixel group along with change of print resolution can be small allows the invention of the present application to comply with various print resolutions while maintaining its effects as well.

Figure 19:
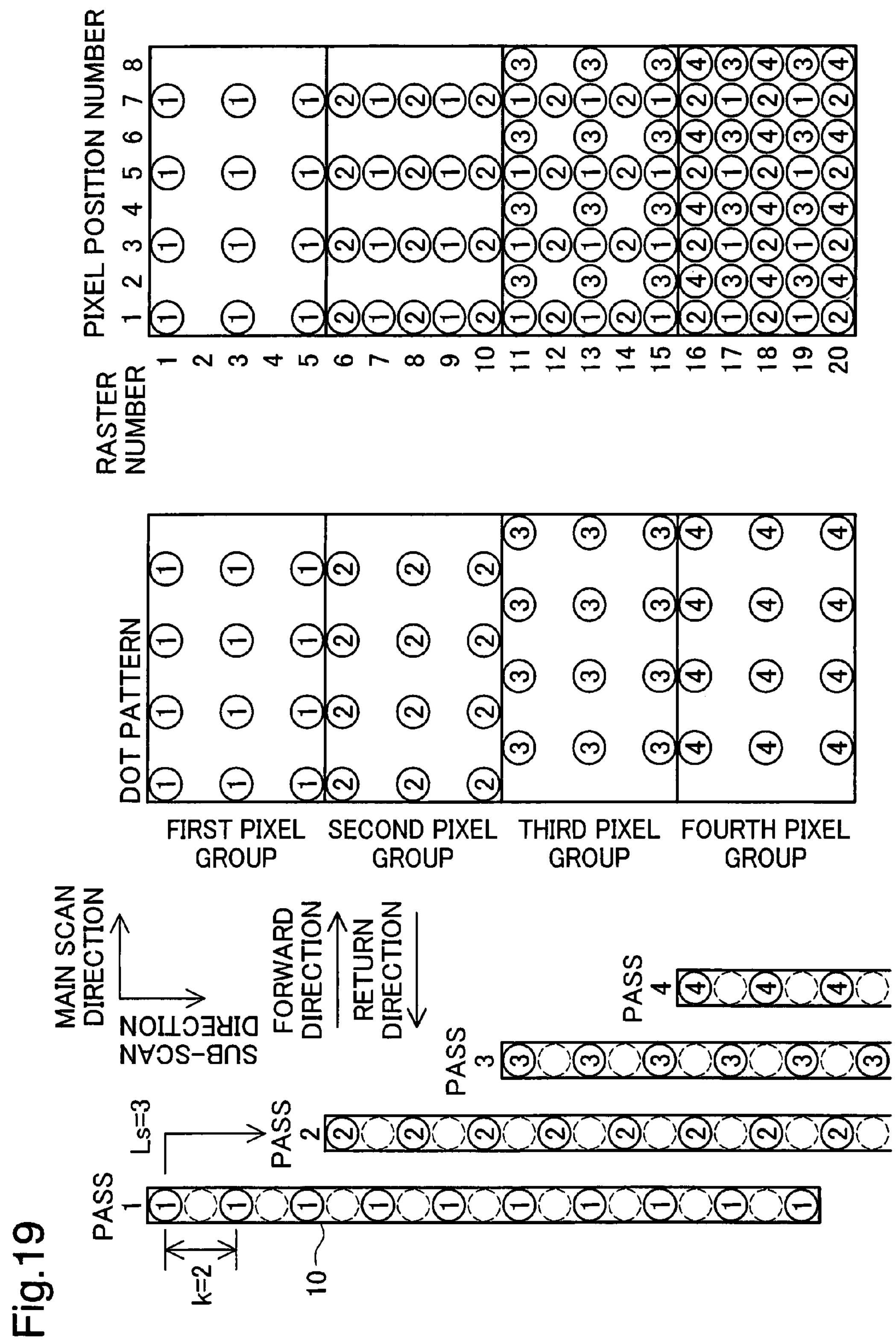
FIG. 19 shows an illustration of an exemplary print image generating process in the embodiments.

E. Method of Dither Matrix Generation in Third Embodiment of Present Invention:

FIG. 19 shows an illustration of an exemplary print image generating process in the third embodiment. The print image is generated on the print medium by forming black ink dots while performing main scanning and sub scanning in this image forming methods for easy-to-follow explanation. The main scan means the operation of moving the printing head 10 (FIG. 3) relatively in the main scanning direction in relation to the print medium. The sub scan means the operation of moving the printing head 10 relatively in the sub scanning direction in relation to the print medium. The printing head 10 is configured so as to form ink dots by spraying ink drops on the print medium. The printing head 10 is equipped with ten nozzles that are not illustrated at intervals of 2 times the pixel pitch k.

Generation of the print image is performed as follows while performing main scanning and sub scanning. Among the ten main scan lines of raster numbers 1, 3, 5, 7, 9, 11, 13, 15, 17, and 19, ink dots are formed at the pixels of the pixel position numbers 1, 3, 5, and 7. The main scan line means the line formed by the continuous pixels in the main scanning direction. Each circle indicates the dot forming position. The number inside each circle indicates the pixel groups configured from the plurality of pixels for which ink dots are formed simultaneously. With pass 1, dots are formed on the print pixels belong to the first pixel group.

When the pass 1 main scan is completed, the sub scan sending is performed at a movement volume Ls of 3 times the pixel pitch in the sub scanning direction. Typically, the sub scan sending is performed by moving the print medium, but with this embodiment, the printing head 10 is moved in the sub scanning direction to make the description easy to understand. When the sub scan sending is completed, the pass 2 main scan is performed.

With the pass 2 main scan, among the ten main scan lines for which the raster numbers are 6, 8, 10, 12, 14, 16, 18, 20, 22, and 24, ink dots are formed at the pixels for which the pixel position number is 1, 3, 5, and 7. Working in this way, with pass 2, dots are formed on the print pixels belonging to the second pixel group. Note that the two main scan lines for which the raster numbers are 22 and 24 are omitted in the drawing. When the pass 2 main scan is completed, after the sub scan sending is performed in the same way as described previously, the pass 3 main scan is performed.

With the pass 3 main scan, among the ten main scan lines including the main scan lines for which the raster numbers are 11, 13, 15, 17, and 19, ink dots are formed on the pixels for which the pixel position numbers are 2, 4, 6, and 8. With the pass 4 main scan, among the ten main scan lines including the three main scan lines for which the raster numbers are 16, 18, and 20, ink dots are formed on the pixels for which the pixel position numbers are 2, 4, 6, and 8. Working in this way, we can see that it is possible to form ink dots without gaps in the sub scan position from raster number 15 and thereafter. With pass 3 and pass 4, dots are formed on the print pixels belonging respectively to the third and fourth pixel groups.

When monitoring this kind of print image generation focusing on a fixed area, we can see that this is performed as noted below. For example, when the focus area is the area of pixel position numbers 1 to 8 with the raster numbers 15 to 19, we can see that the print image is formed as noted below at the focus area.

With pass 1, at the focus area, we can see that a dot pattern is formed that is the same as the ink dots formed at the pixel positions for which the pixel position numbers are 1 to 8 with the raster numbers 1 to 8. This dot pattern is formed by dots formed at the pixels belonging to the first pixel group. Specifically, with pass 1, for the focus area, dots are formed at pixels belonging to the first pixel group.

With pass 2, at the focus area, dots are formed at the pixels belonging to the second pixel group. With pass 3, at the focus area, dots are formed at the pixels belonging to the third pixel group. With pass 4, at the focus area, dots are formed at the pixels belonging to the fourth pixel group.

In this way, the monochromatic print with this embodiment, we can see that the dots formed at the print pixels belonging to each of the plurality of first to fourth pixel groups are formed by mutually combining in the common print region. Meanwhile, in color printing color printed images are formed by means of ejecting ink of the colors C, Mz, Y and K from the ink head (FIG. 3), onto each of the first to fourth multiple pixel groups, in the same manner.

Figure 20:
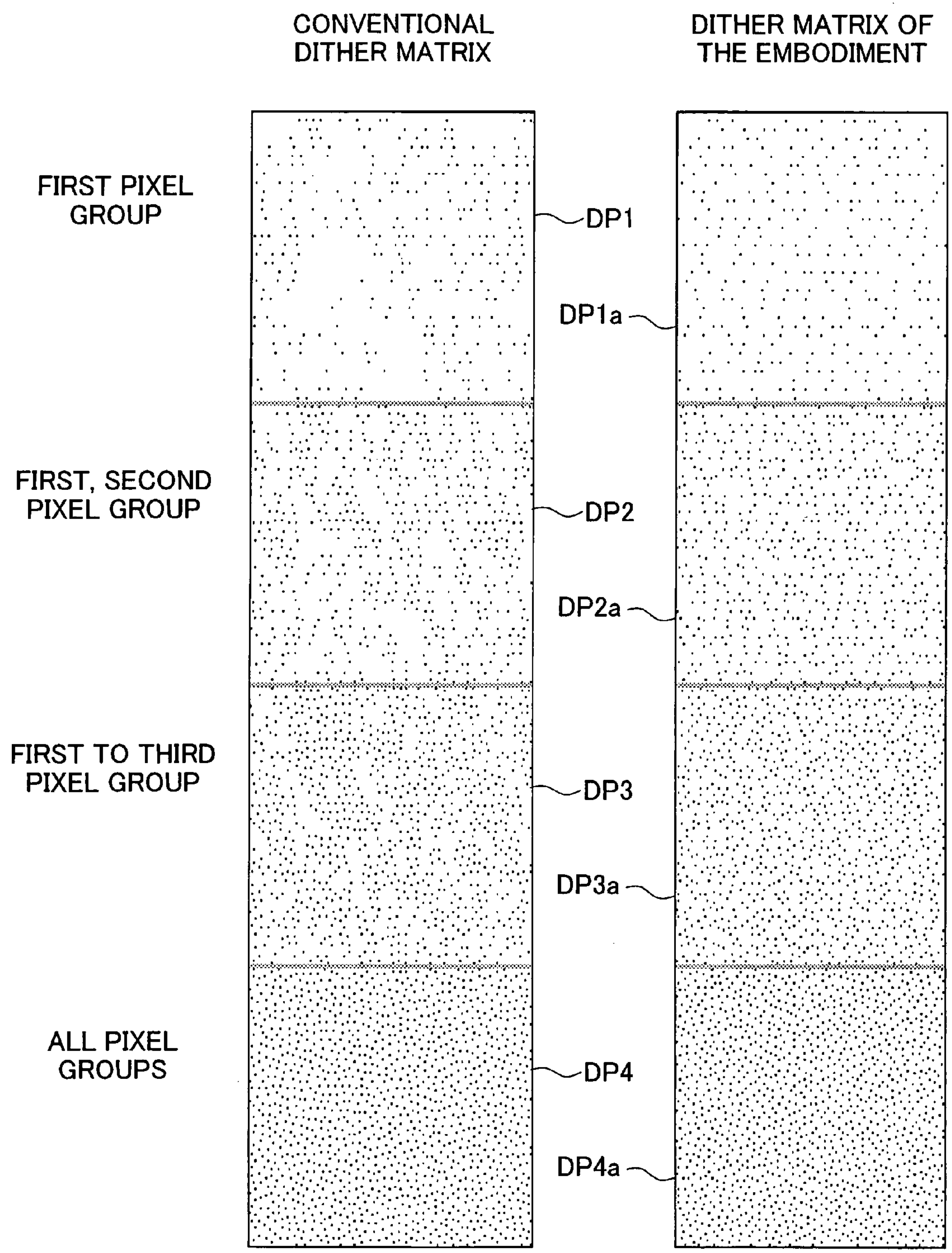
FIG. 20 shows an illustration depicting creation of a printed image on a printing medium in the embodiments by means of combining print pixels that belong to multiple pixel groups in a common printing region.

FIG. 20 shows an illustration depicting creation of a printed image on a printing medium in the third embodiment by means of combining, into a common printing region, print pixels that belong to multiple pixel groups. In the example of FIG. 20, the printed image is a printed image of prescribed intermediate tone (monochrome). The dot patterns DP1, DP1*a* are dot patterns formed on a plurality of pixels belonging to a first pixel group. The dot patterns DP2, DP2*a* are dot patterns formed on a plurality of pixels belonging to the first and a second pixel group. The dot patterns DP3, DP3*a* are dot patterns formed on a plurality of pixels belonging to the first to third pixel groups. The dot patterns DP4, DP4*a* are dot patterns formed on a plurality of pixels belonging to all of the pixel groups.

The dot patterns DP1, DP2, DP3, DP4 are dot patterns obtained where a conventional dither matrix is used. The dot patterns DP1*a*, DP2*a*, DP3*a*, DP4*a* are dot patterns obtained where the dither matrix of the embodiment is used. As will be apparent from FIG. 20, where the dither matrix of the embodiment is used, dispersion of dots is more uniform than here a conventional dither matrix is used, especially for the dot patterns DP1*a*, DP2*a* having minimal overlap of dot pattern.

Since conventional dither matrices lack the concept of pixel groups, optimization is carried out in a manner focused exclusively on dispersion of dots in the final printed image (in the example of FIG. 20, the dot pattern DP4).

However, the inventors have carried out an analysis of image quality of printed images, focusing on the dot patterns in the course of the dot formation process. As a result of the analysis, it was found that image irregularity may arise during the dot formation process due to density level of dot patterns. The inventors discovered that such image irregularity occurs because dots of several colors formed during a given main scan pass do not overlap in a uniform manner, thus producing areas in which dots of several colors come into contact and bleed together and areas in which where dots of several colors remain separate and do not bleed together, occur in mottled patterns, which in turn causes irregular color.

Such color irregularity may occur even where a printed image is formed in a single pass. However, even if color irregularity is produced uniformly throughout the entire image, it will nevertheless not be readily apparent to the human visual faculty. This is because, due to the fact that the irregularity occurs uniformly, ink bleed will not take the form of nonuniform "irregularity" that includes a low-frequency component.

In a dot pattern composed of pixel groups in which ink dots are formed substantially simultaneously during a given main scan, if irregularity should happen to occur due to ink bleed in a low-frequency region that is readily noticeable to the human eye, marked degradation of image quality will become apparent. In this way, the inventors discovered for the first time that, where a printed image is produced by means of forming ink dots, high levels of image quality may be obtained if the dither matrix is optimized giving attention to the dot patterns formed in pixel groups in which ink dots are formed substantially simultaneously.

The inventors further ascertained that degraded image quality of an extent highly noticeable to the human eye may result not only from ink bleed, but also from physical phenomena of the ink, such as ink agglomeration, irregular sheen, or bronzing. Bronzing is a phenomenon whereby, due to factors such as coagulation of dye in ink drops, the condition of reflected light on the printed paper surface varies so that, for example, the printed surface develops a bronze-colored appearance depending on the viewing angle.

Furthermore, conventional dither matrices, attempt to achieve optimization on the assumption that positional relationships among pixel groups are the same as the ones posited in advance; thus, in the event that actual positional relationships should deviate, optimality can no longer be assured and appreciable degradation of image quality may result. However, experiments conducted by the inventors have shown for the first time that, with the dither matrix of the embodiment, due to the fact that dispersion of dots is assured in dot patterns within dot groups as well, a high level of robustness against such deviation in positional relationships can be assured.

The inventors have furthermore found that this technical concept assumes increased importance as printing speed increases. This is because faster printing speed means that dots of the next pixel group are formed before there has been sufficient time for the ink to be absorbed.

Based on this standpoint, the inventors of the present application created a dither matrix generation method that can reduce degradation of image quality caused by performing a plural times of scans to form ink dots in a common region on a printing medium to print an image. The inventors of the present application also found that the generation method can also be combined with each of the embodiments described above.

Figure 21:
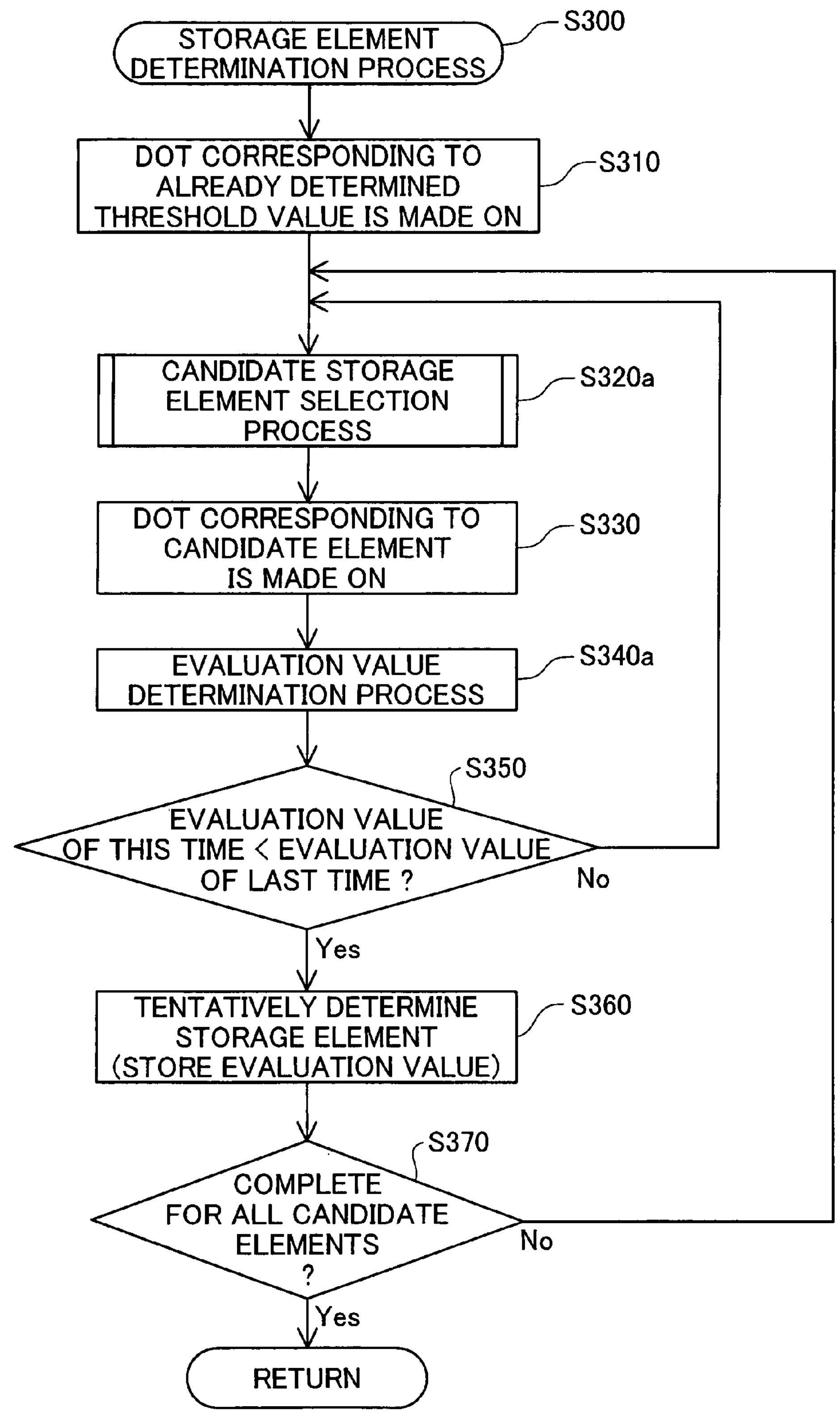
FIG. 21 is a flowchart showing the processing routine of a storage element determination process in a third embodiment of the present invention.

FIG. 21 is a flowchart showing the processing routine of a storage element determination process in the third embodiment of the present invention. In the dither matrix generation method of the embodiment, it is configured such that optimization can be performed in consideration of dispersion of dots formed by each main scan (pass) in the print image generating process. In this example, a small dither matrix of 8 rows and 8 columns is generated for ease of explanation. A graininess index (Formula F2) is used as an evaluation value for representing optimality of the dither matrix, similarly to the first embodiment.

The generation process of the third embodiment is configured by replacing step S320 (candidate storage element selection process) and step S340 (evaluation value determination process) in the generation process of the first embodiment (FIG. 11) with step S320*a* and step S340*a*, respectively.

Figure 22:
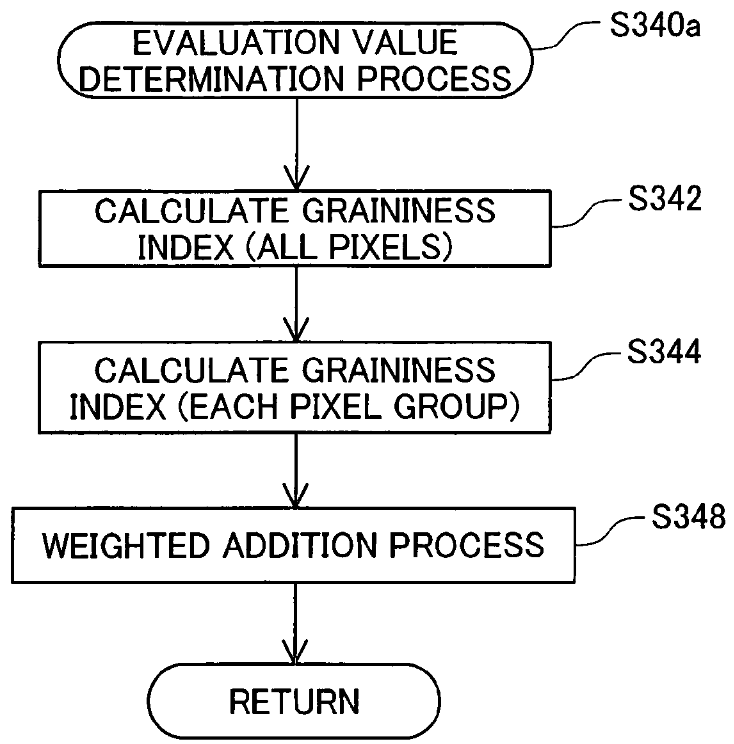
FIG. 22 is a flowchart showing the processing routine of an evaluation value determination process in the third embodiment of the present invention.
Figure 27:
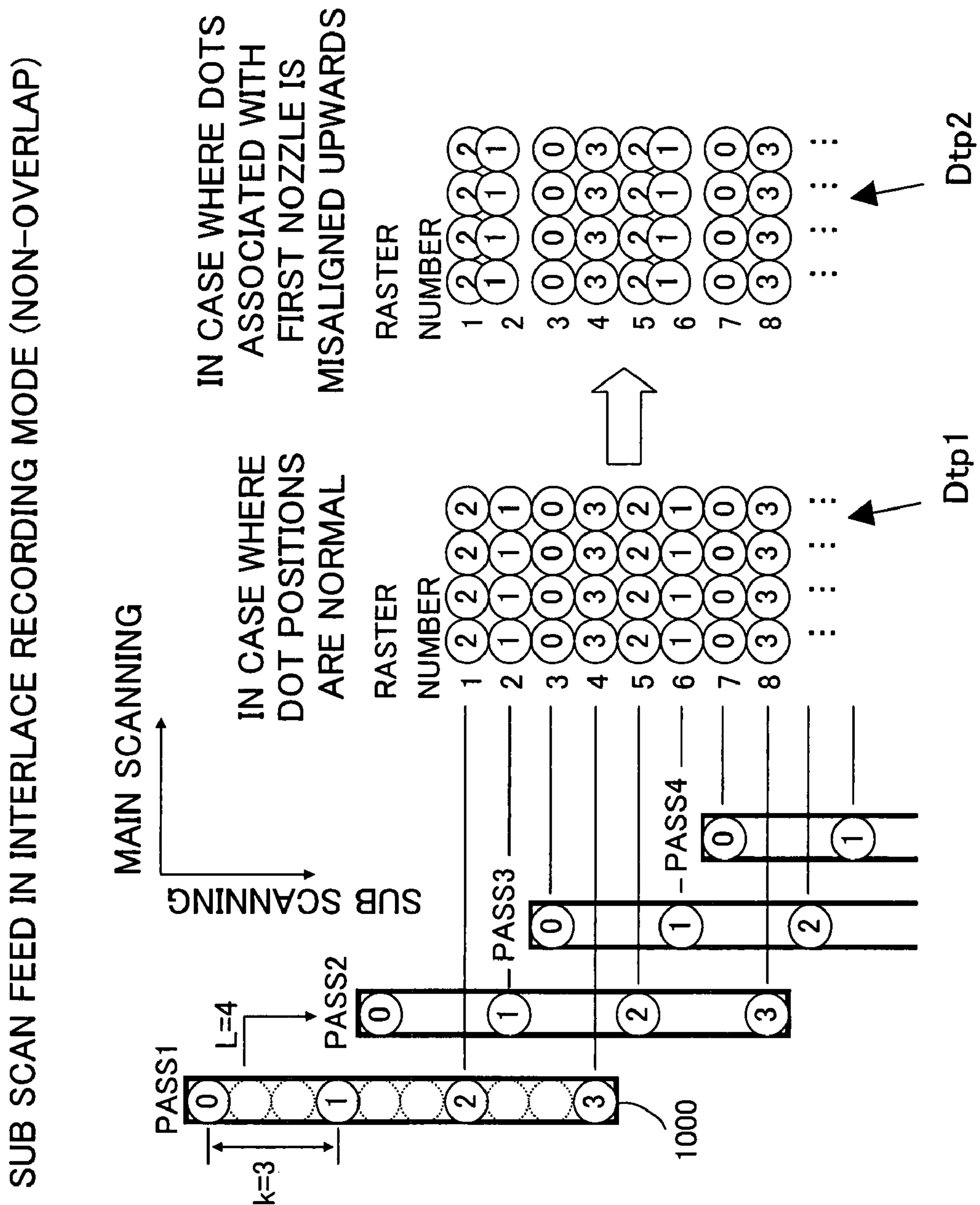
FIG. 27 shows how banding is produced in an interlace recording mode.

FIG. 22 is a flowchart showing the processing routine of an evaluation value determination process in the third embodiment of the present invention. The processing routine differs from the evaluation value determination process of the first embodiment in that dot patterns formed on a plurality of pixels belonging respectively to first to fourth pixel groups are also targeted for evaluation. In step S342, a graininess index calculation process is performed. This process is targeted at all pixels and is the same process as the graininess index calculation process in the first embodiment.

In step S344, the graininess index calculation process is performed with respect to each pixel group. In this process, a graininess index is calculated based on dot patterns formed on a plurality of pixels belonging respectively to the first to fourth pixel groups.

FIG. 23 is an illustration depicting a dither matrix M subjected to a grouping process in the third embodiment of the present invention. In this grouping process, the dither matrix M is divided into four pixel groups shown in FIG. 19. Each number marked on each element of the dither matrix M indicates the pixel group to which the element belongs. For example, an element in the first row of the first column belongs to the first pixel group (FIG. 19), and an element in the second row of the first column belongs to the second pixel group.

FIG. 24 is an illustration depicting four divided matrices M1-M4 in the third embodiment of the present invention. The divided matrix M1 is composed of: a plurality of elements that correspond to pixels belonging to the first pixel group, among the elements of the dither matrix M; and blank elements i.e. a plurality of elements in blank. The blank element is an element in which no dot is formed irrespective of input tone value. The divided matrices M2, M3, and M4 are respectively composed of: a plurality of elements that correspond to pixels belonging to the second, third, and fourth pixel groups, among the elements of the dither matrix M; and blank elements.

FIG. 25 is an illustration depicting four dot patterns Dp1, Dp2, Dp3, Dp4 formed in print pixels belonging respectively to first to fourth pixel groups, among elements storing the threshold values associated with the first to eighth greatest tendency to dot formation in the dither matrix M. In FIG. 25, a print pixel that corresponds to a candidate storage element is also indicated by the mark "*". FIG. 26 is an illustration depicting dot density matrices Dd1, Dd2, Dd3, Dd4 that correspond respectively to the four dot patterns Dp1, Dp2, Dp3, Dp4.

Graininess indices of the respective pixel groups are calculated based on the five dot density matrices Dda, Dd1, Dd2, Dd3, and Dd4 thus determined, similarly to the first embodiment.

In step S348, a weighted addition process is performed. The weighted addition process is a process of assigning weights to the respective calculated graininess indices and then adding them together. The process is performed based on the computational equation shown in FIG. 22. Specifically, it is determined as a sum of: a value obtained by multiplying the graininess index Ga regarding all pixels by a weighting coefficient Wa (four, for example); and a value obtained by multiplying a sum of the four graininess indices G1, G2, G3, G4 respectively regarding the first to fourth pixel groups by a weighting coefficient Wg (one, for example).

As described above, in the present embodiment, a dither matrix M is optimized in such a way that reduces graininess indices of a plurality of dot patterns respectively formed by each main scan. It is therefore possible to reduce degradation of image quality attributable to physical phenomenon of ink occurring mutually among the plurality of dot patterns respectively formed by each main scan.

Such difference of main scan in process of dot formation corresponds to "physical difference" in the scope of claim for patent. The "physical difference" in the scope of claim for patent not only include any misalignment of dot due to error in mechanism of a printing device such as measuring error of print head position, measuring error of sub scan feed amount, and the like, but also has a broader meaning including factors such as misalignment of dot in main scanning direction due to uplift of a print paper, deviation (time lag) or sequence of ink ejection timing (temporal error), and the like. The positional misalignment of dot becomes obvious as, for example, positional misalignment between dots formed by forward pass of main scan by a print head and dots formed by backward pass of main scan by the print head in main scanning direction.

F. Modifications:

Although the present invention has been described above in terms of several embodiments, the present invention is not restricted to these embodiments, but may be implemented in various modes without departing from the scope of the present invention. For example, the present invention allows for optimization of dither matrix with respect to the following modifications.

F-1. Although in above embodiments, it is configured such that difference in number of dots formed in each of element groups, which were made by dividing a dither matrix into groups having the same number of elements, falls within a predetermined range; however, it would be acceptable if difference in dot density falls within a predetermined range. Furthermore, as long as difference in dot density falls within a predetermined range, the predetermined element groups not necessarily have the same number of elements. Here, the "dot density" means a product of a dot recording rate and a dot area, where the dot recording rate is a value obtained by dividing a number of dots formed by a number of pixels. Note that, in case where plural sizes of dots are formed, the dot density is calculated by adding each product of a dot recording rate and a dot area with respect to each dot size. In case where only a single size of dot is formed, the dot density is a physical quantity that is substantially equivalent to the dot recording rate.

F-2. Although in above embodiments, graininess index is used as a scale of dither matrix evaluation; however, it would also be acceptable to use other scales, for example, RMS granularity that will be described later. This scale of evaluation can be determined by subjecting dot density values to a low pass filtering process using a predetermined low pass filter and then calculating a standard deviation of the density values after the low pass filtering process.

F-3. Although in above embodiments, indices such as graininess index and RMS granularity are used as an evaluation value for representing correlation with a predetermined target state; however, it would also be acceptable to use blue noise characteristics or green noise characteristics as a target state and optimize a dither matrix so as to bring its characteristic nearer to these characteristics. Furthermore, although in above embodiments, an evaluation value is determined by using a dot pattern of all pixels or dot patterns of respective pixel groups as target of evaluation; however, it would also be acceptable to include predetermined element groups as target of evaluation.

F-4: Although in above embodiments, the evaluation process is performed each time a storage element for storing a threshold value is determined; however, the present invention would also be applicable to cases where storage elements for storing a plurality of threshold values are determined simultaneously at one time, for example. Specifically, for example, in case where storage elements of first to sixth threshold values have been determined and storage elements of seventh and eighth threshold values are now to be determined in above embodiments, storage elements of the seventh and eighth threshold values may be determined based on an evaluation value associated with the time a dot has been added to a storage element of the seventh threshold value and an evaluation value associated with the time dots have respectively been added to storage elements of the seventh and eighth threshold values, or alternatively, only a storage element of the seventh threshold value may be determined.

F-5. In above embodiments, a dither matrix is generated by determining a target threshold value by selecting threshold values in ascending order i.e. in order of decreasing tendency to dot formation, and then, based on a matrix evaluation value that represents correlation with a predetermined target state and is calculated based on state of dot formation under the assumption that the target threshold value thus determined is stored in each element, determining a storage element for the target threshold value out of the plurality of candidate storage elements. However, such method is not restrictive, and it would also be acceptable to select threshold values in descending order. However, the method used in the embodiments is advantageous in that greater degrees of design freedom can be provided to highlight regions having conspicuous dot graininess.

Furthermore, threshold values are not necessarily determined in sequence, but it would also be acceptable to generate a dither matrix by preparing a dither matrix as initial state, and determining each element for storing each threshold value while replacing a part of a plurality of threshold values stored in respective elements with different threshold value(s) stored in other element(s). In this case, an evaluation function can be established by including difference in dot density formed in each of predetermined element groups into the evaluation function (punishment function). Note that a dot density matrix, which works as a criterion of evaluation, may be generated based on a minimum input tone value that allows for formation of dot in association with a target threshold value, or alternatively, may be generated based on an input tone value equal to or greater than the minimum input tone value.

F-6. The present invention may also be reduced to practice as a density calibration device and a density calibration method that employ a dither matrix thus generated. For example, the present invention may be reduced to practice as a density calibration method that generates correction data for calibrating image density printed on a printing medium.

In this density calibration method, dot data that represent state of dot formation is generated according to calibration-use pattern data that includes uniform density image data generated by a uniform input tone value, by using a dither matrix that is generated by the method disclosed in each of above embodiments, and then, dots are formed on a printing medium according to this dot data. Next, density of the uniform density image printed by a scanner (not shown) is measured with respect to each predetermined print pixel group, and according to the density thus measured, correction data that includes a correction value for reducing dispersion of density in the uniform density image may be generated with respect to each predetermined print pixel group.

In a density calibration method that employs a conventional dither matrix, there has been a problem of degradation in calibration precision since density had changed according to the positional relationship between an image of calibration-use pattern and a dither matrix. However, according to a density calibration method of the present invention, such change in density can be reduced so that calibration precision can be enhanced.

Furthermore, in the density calibration method of the invention of the present application, it would also be acceptable to consider a cluster of pixels neighboring in the main scanning direction (raster line) as a predetermined print pixel group. This reduces deviation in tone on each raster line, and thereby reduces banding that has become obvious in combination with factors such as manufacturing error of nozzle (error in ink flight direction, error in ink amount, and the like), error in sub scan feed, and warpage of printing paper. In particular, as described above, in a general case where a dither matrix is arranged with shifts as shown in FIG. 9, how to reduce deviation in tone on each raster line is still remaining as an unsolved problem of uncertain cause.

F-7. Although the above embodiments and modifications are described in terms of an inkjet printer as an example, however, the present invention is also applicable to other printing devices such as a laser printer. For example, while the calibration of density can be reduced to practice as correction of ink amount as for an inkjet printer, it can also be reduced to practice as correction of amount of light in a laser printer.

Finally, the Japanese patent application (JP-A-2006-278389 filed on Oct. 12, 2006) on which the priority claim of the present application is based is incorporated herein by reference.

What is claimed is:

1. A printing method of printing on a printing medium, comprising:

generating dot data that represents state of dot formation at each print pixel of a print image to be formed on the printing medium by performing a halftone process on image data that represents an input tone value of each pixel making up an original image; and generating the print image by forming dots on each of the print pixels according to the dot data, wherein the halftone process determines the state of dot formation by using a dither matrix that stores a plurality of threshold values, the plurality of threshold values being used for determining state of dot formation at each of print pixels of the print image to be formed on the printing medium according to an input tone value;

the dither matrix is a matrix that stores each of the plurality of threshold values in each element such that a mutual difference in dot density formed at each predetermined print pixel group according to each input tone value falls within a predetermined range; and the predetermined print pixel group is a cluster of plural print pixels corresponding to each of a plurality of element groups that are created by dividing the dither matrix into preset numbers of elements, and wherein the dither matrix is generated by storing multiple threshold values according to a rank order in each element for each print pixel group, based on a predetermined dither matrix generation method, and when storing the threshold values, a subsequent threshold value in the rank order is stored in a candidate storage element that is included in at least one of certain lines and columns which have values smaller than a predetermined value, the values being represented by a counted number of threshold values already stored in the print pixel group and the counted number being counted for each line and each column in the print pixel group.

2. The printing method according to claim 1, wherein the dither matrix is generated by a predetermined dither matrix generation method, wherein the predetermined dither matrix generation method includes determining a storage element that determines a storage element for a target threshold value out of a plurality of candidate storage elements based on a matrix evaluation value, the matrix evaluation value representing correlation with a predetermined target state and each of a plurality of assumed states of dot formation, each of the plurality of assumed states of dot formation being configured such that the target threshold value is stored in each of a plurality of candidate storage elements that are candidate elements for storing the target threshold value, wherein the determining includes determining the storage element such that a mutual difference in dot density formed among the plurality of predetermined print pixel groups according to each input tone value falls within a predetermined range.

3. The printing method according to claim 2, wherein the predetermined dither matrix generation method further includes:

selecting the target threshold value for which an element for storage is undetermined and has a greatest tendency to dot formation among the plurality of threshold values; and repeating the selecting the target threshold value and the determining the storage element with respect to at least a part of the plurality of threshold values.

4. The printing method according to claim 2, wherein the determining a storage element includes determining a number of elements belonging to each of the a plurality of element groups according to a size of the print pixel to reduce a change of size of the predetermined print pixel group along with a change of print resolution.

5. The printing method according to claim 2, wherein the matrix evaluation value includes a divided matrix evaluation value representing a correlation between the predetermined target state and the state of dot formation assumed with respect to the predetermined print pixel group.

6. The printing method according to claim 2, wherein the predetermined print pixel group has such a small size that allows for arrangement at a pitch equal to or greater than 5 cycles per millimeter.

7. The printing method according to claim 2, wherein the generating the print image includes forming dots on the printing medium while alternately performing main scan of a print head and sub scan of paper feed, and the predetermined print pixel group is a cluster of pixels neighboring in direction of the main scan.

8. The printing method according to claim 2, wherein the generating the print image includes forming dots on the printing medium while performing sub scan of paper feed, and the predetermined print pixel group is a cluster of pixels neighboring in direction of the sub scan.

9. The printing method according to claim 8, wherein the generating dot data includes generating the dot data by arranging the dither matrix with shifts in a direction perpendicular to the direction of the sub scan.

10. The printing method according to claim 2, wherein the generating the print image includes forming a print image by mutually combining dot groups in a common print region, each of the dot groups being formed in each of a plurality of pixel groups assumed to have a mutually physical difference in a process of dot formation, and the determining a storage element includes storing each of the plurality of threshold values into each element such that a degradation of image quality due to the physical difference is reduced.

11. The printing method according to claim 2, wherein the matrix evaluation value is a graininess index calculated by a computing process including a Fourier transform process, and the graininess index is calculated based on a VTF function that is determined based on visual spatial frequency characteristic and a constant that is calculated in advance by the Fourier transform process.

12. The printing method according to claim 2, wherein the matrix evaluation value is a RMS granularity that is calculated by a computing process including a low pass filtering process.

13. The printing method according to claim 1, wherein the values represented by the counted number of threshold values are obtained for the respective lines by subtracting the smallest number of threshold values among the counted numbers of threshold values from the number of threshold values counted for each line, and obtained for the respective columns by subtracting the smallest number of threshold values among the counted numbers of threshold values from the number of threshold values counted for each column.

14. The printing method according to claim 1, wherein the candidate storage element is included in the lines and columns whose values represented by the counted number of threshold values are smaller than the predetermined value.

15. A printing apparatus that performs printing on a printing medium, comprising:

a dot data generator that generates dot data that represents state of dot formation at each print pixel of a print image to be formed on the printing medium by performing a halftone process on image data that represents an input tone value of each pixel making up an original image; and a print image generator that generates the print image by forming dots on each of the print pixels according to the dot data, wherein the halftone process determines the state of dot formation by using a dither matrix that stores a plurality of threshold values, the plurality of threshold values being used for determining state of dot formation at each of print pixels of the print image to be formed on the printing medium according to an input tone value;

the dither matrix is a matrix that stores each of the plurality of threshold values in each element such that a mutual difference in dot density formed at each predetermined print pixel group according to each input tone value falls within a predetermined range; and the predetermined print pixel group is a cluster of plural print pixels corresponding to each of a plurality of element groups that are created by dividing the dither matrix into preset numbers of elements, and wherein the dither matrix is generated by storing multiple threshold values according to a rank order in each element for each print pixel group, based on a predetermined dither matrix generation method, and when storing the threshold values, a subsequent threshold value in the rank order is stored in a candidate storage element that is included in at least one of certain lines and columns which have values smaller than a predetermined value, the values being represented by a counted number of threshold values already stored in the print pixel group and the counted number being counted for each line and each column in the print pixel group.

* * * * *